US006901162B2

(12) United States Patent
Kagawa et al.

(10) Patent No.: US 6,901,162 B2
(45) Date of Patent: May 31, 2005

(54) IMAGE DISPLAY DEVICE

(75) Inventors: Shuichi Kagawa, Tokyo (JP); Hiroaki Sugiura, Tokyo (JP); Mariko Takahashi, Tokyo (JP); Narihiro Matoba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 560 days.

(21) Appl. No.: 09/730,755

(22) Filed: Dec. 7, 2000

(65) Prior Publication Data

US 2001/0003543 A1 Jun. 14, 2001

(30) Foreign Application Priority Data

Dec. 9, 1999 (JP) .......................................... 11-349717

(51) Int. Cl.⁷ ................................................ G06K 9/00
(52) U.S. Cl. ..................................................... 382/162
(58) Field of Search .............................. 382/162–167; 358/500–540; 348/645–661; 345/598–610

(56) References Cited

U.S. PATENT DOCUMENTS

| | | | |
|---|---|---|---|
| 4,665,935 A | | 5/1987 | Nichols |
| 4,706,108 A | | 11/1987 | Kumagai et al. |
| 4,740,833 A | | 4/1988 | Shiota et al. |
| 4,887,150 A | | 12/1989 | Chiba |
| 4,989,079 A | | 1/1991 | Ito |
| 5,436,733 A | | 7/1995 | Terada et al. |
| 5,588,050 A | | 12/1996 | Kagawa |
| 5,619,280 A | * | 4/1997 | Yamashita et al. .......... 348/645 |
| 5,659,406 A | | 8/1997 | Imao et al. |
| 5,729,636 A | | 3/1998 | Kagawa |
| 5,917,959 A | * | 6/1999 | Kagawa et al. ............. 382/276 |
| 5,930,009 A | * | 7/1999 | Sato et al. .................. 358/518 |
| 5,933,252 A | | 8/1999 | Emori et al. |
| 5,963,201 A | | 10/1999 | McGreggor et al. |
| 6,125,202 A | | 9/2000 | Kagawa et al. |
| 6,320,980 B1 | * | 11/2001 | Hidaka ....................... 382/167 |
| 6,424,374 B2 | * | 7/2002 | Itakura ...................... 382/167 |
| 6,434,266 B1 | * | 8/2002 | Kanno et al. ................ 382/162 |
| 6,434,268 B1 | | 8/2002 | Asamura et al. |

FOREIGN PATENT DOCUMENTS

| | | | | |
|---|---|---|---|---|
| EP | 1028586 A | 8/2000 | | |
| JP | 61-237588 A | 10/1986 | | |
| JP | 63-39188 | 8/1988 | | |
| JP | 63227181 | 9/1988 | | |
| JP | 230226 | 7/1990 | | |
| JP | 404167667 A | * 6/1992 | ............ H04N/1/40 |
| JP | 5-48885 | 2/1993 | | |
| JP | 5-183742 | 7/1993 | | |
| JP | 07-023245 | 1/1995 | | |
| JP | 7170404 | 7/1995 | | |
| JP | 8-321964 | 12/1996 | | |
| JP | 09-098443 A | 4/1997 | | |
| JP | 09-270926 A | 10/1997 | | |
| JP | 10-233934 A | 9/1998 | | |
| JP | 11-17974 | 1/1999 | | |

* cited by examiner

Primary Examiner—Jingge Wu
(74) Attorney, Agent, or Firm—Birch, Stewart, Kolasch & Birch, LLP

(57) ABSTRACT

In an image display device for receiving and displaying image data, color converter converts the image data on the basis of conversion characteristics data stored in a conversion characteristics storage. The conversion characteristics designation means including means for designating the hue of the colors outputs the conversion characteristics designation data, and conversion characteristics setting means calculates the conversion characteristics data on the basis of the conversion characteristics designation data, and sets the conversion characteristics data in the conversion characteristics storage. The color converter comprises a calculation term generator for receiving the first image data, and outputting calculation terms which are effective just for the specific hues; and a matrix calculator performing matrix calculation using the calculation terms effective just for the specific hues. The user can adjust just the hue of the desired color. Real-time processing of moving pictures can be achieved without placing a heavy load on a CPU. The image after the adjustment can be displayed on a real-time basis.

9 Claims, 17 Drawing Sheets

| IDENTIFICATION CODE S1 | MAXIMUM VALUE β | MINIMUM VALUE α | HUE DATA OF A VALUE ZERO |
|---|---|---|---|
| 0 | Ri | Gi | g,c |
| 1 | Ri | Bi | b,c |
| 2 | Gi | Ri | r,m |
| 3 | Gi | Bi | b,m |
| 4 | Bi | Ri | r,y |
| 5 | Bi | Gi | g,y |

\* $r=Ri-\alpha, g=Gi-\alpha, b=Bi-\alpha$
$y=\beta-Bi, m=\beta-Gi, c=\beta-Ri$

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

FIG. 13A

| HUE | EFFECTIVE FIRST COMPARISON-RESULT DATA |
|---|---|
| RED | h1r |
| GREEN | h1g |
| BLUE | h1b |
| CYAN | h1c |
| MAGENTA | h1m |
| YELLOW | h1y |

FIG. 13B

| INTER-HUE AREA | EFFECTIVE SECOND COMPARISON-RESULT DATA |
|---|---|
| RED-YELLOW | h2ry |
| YELLOW-GREEN | h2gy |
| GREEN-CYAN | h2gc |
| CYAN-BLUE | h2bc |
| BLUE-MAGENTA | h2bm |
| MAGENTA-RED | h2rm |

FIG. 18
COLOR TEMP. SETTING
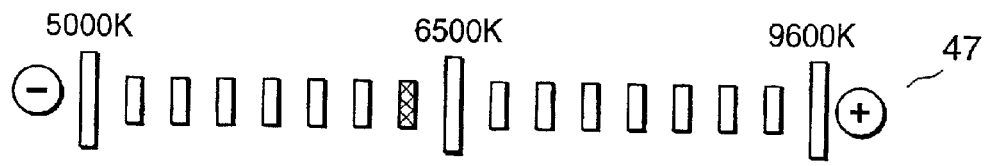
HUE ADJUSTMENT
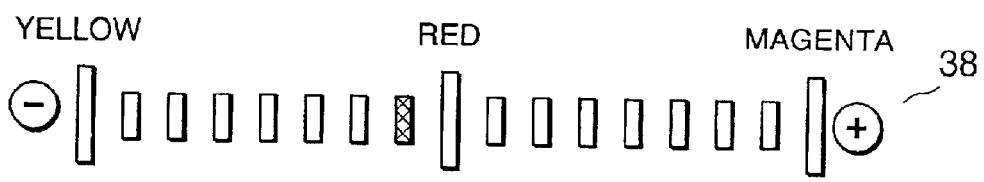
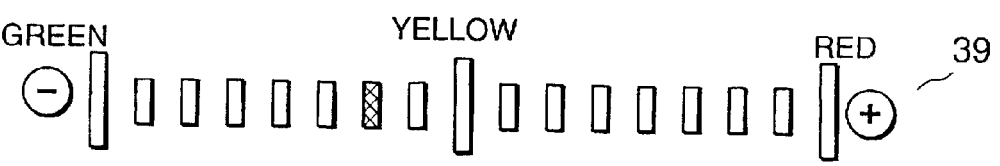
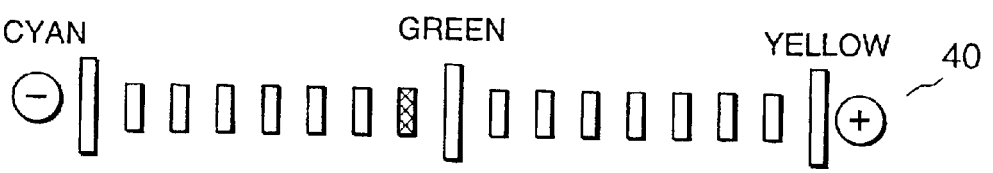
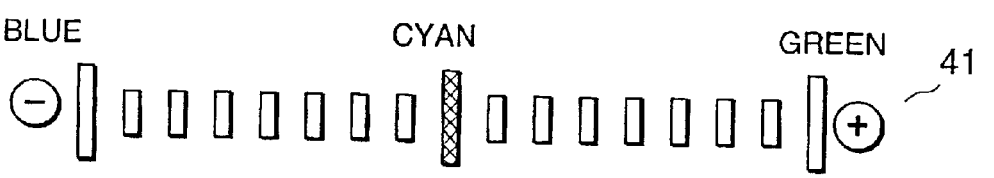
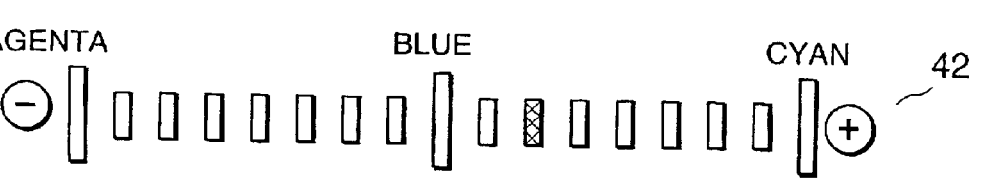

IMAGE DISPLAY DEVICE

BACKGROUND OF THE INVENTION

The present invention relates to an image display device, and in particular to an image display device, such as a monitor, which can display color images, and which permits a user to adjust the color reproducibility.

A prior art method of adjusting the color reproducibility for an image display device is described with reference to FIG. 22.

FIG. 22 shows an example of control panel for adjusting the color reproducibility in the prior art image display device. In FIG. 22, reference numeral 101 denotes a red signal intensity setting means, 102 denotes a green signal intensity setting means, and 103 denotes a blue signal intensity setting means. In FIG. 22, the signal intensities of red, green and blue are adjusted using the red signal intensity setting means 101, the green signal intensity setting means 102 and the blue signal intensity setting means 103. For example, if the signal intensities of green and blue are reduced, the image displayed will generally be reddish.

In the image display device provided with the above-described adjusting means, it is only possible to adjust the signal intensities of red, green and blue, with respect to all the colors in the image, and it is not possible to finely adjust the colors according to the preference of the user.

Japanese Patent Kokai Publication H05-48885 discloses a different method of adjusting the color image. According to the method disclosed in Japanese Patent Kokai Publication No. H05-48885, an image is displayed on an image display device, simulating an image outputted from a hard copy device. While observing the simulation image displayed on the image display device, the optimum parameters for the hard copy device are determined. The concept of the image adjustment for the hard copy device can be applied to an image display device.

FIG. 23 shows the configuration of a device using the image adjustment method disclosed in Japanese Patent Kokai Publication No. H05-48885. In FIG. 23, reference numeral 104 denotes a keyboard, 105 denotes a mouse, 106 denotes an input means, 107 denotes a controller, 108 denotes an input circuit, 109 denotes a memory, 110 denotes a CPU, 111 denotes an output circuit, 112 denotes an image display unit, 113 denotes an original image, 114 denotes a processed image, 115 denotes set parameters, and 116 denotes a hard copy device. The keyboard 104 and the mouse 105 are both an example of the input means 106. The controller 107 is formed of the input circuit 108 connected to the input means 106, the memory 109, the CPU 110, and the output circuit 111. The image display unit 112 is driven by the output circuit 111. The operation of the device using the image adjustment method of FIG. 23 will next be described.

The memory 109 stores a color conversion simulation program. The CPU 110 executes the program stored in the memory 109. First, it reads the image data used for the color conversion simulation. The image data having been read is displayed as the original image 113 on the image display unit 112. Next, the input means 106 is used to input the specific manner of processing specifying how the processing is to be performed. Then, the color conversion performed by the hard copy device 116 is simulated, on the image data having been read, in accordance with the designated manner of processing. The color converted, processed image 114 is displayed on the screen of the image display device 112, together with the original image 113. When the parameters for the color conversion can be changed step-wise, a plurality of the processed images which are obtained from the respective steps are displayed together, arranged in an array. By selecting that one of the processed images that is closest to the original image 113, the optimum parameters are determined. For determining a plurality of parameters, the above-mentioned operations are repeated, so that the parameters are determined in turn. The color conversion parameters thus determined are sent to the hard copy device.

In the device using the above-described image adjustment method, the color conversion is simulated in accordance specific manner of processing designated by the input means 106, and by selecting that one of the processed images which is optimum, the color conversion parameters can be determined. Accordingly, there is a freedom in the adjustment depending on the type of the color conversion parameters that can be set. The freedom in the adjustment is greater than in the arrangement in which adjustment is made only on the signal intensities of red, green and blue. Moreover, it is easy for the user to set the parameters.

The above-described color adjustment method has a problem in that because simulation is performed by means of a CPU, if the accuracy of the simulation is low, the parameters that are determined are not necessarily optimum. Moreover, the load on the CPU which performs the simulation is heavy. Furthermore, because the simulation by means of the CPU is used, it is not suitable for a real-time processing of moving pictures due to the limitation in the processing speed.

When a plurality of processed images are displayed simultaneously, it is necessary to perform the simulation a number of times equal to the number of processed images displayed simultaneously, so that the problems of the load on the CPU and the processing speed are more serious. In addition, when a plurality of processed images are displayed simultaneously, the size of each of the displayed processed images is small, so that they may give different impression than the image outputted at full size, after the determination of the parameters.

SUMMARY OF THE INVENTION

The invention has been made to solve the problems described above.

An object of the invention is to provide an image display device with which the user can adjust any desired color without influencing other colors, which can perform real-time processing of moving pictures, and the images after the adjustment can be displayed at full size.

According to a first aspect of the invention, there is provided an image display device for receiving an input image data comprising three or more color data, and displaying the input image data on an image display unit, comprising:

a color converter for for converting a first image data comprising three or more color data, into a second image data comprising three or more color data, on the basis of conversion characteristics data;

a conversion characteristics storage for storing the conversion characteristics;

conversion characteristics designation means for designating the conversion characteristics to be used in the color converter, and outputting the conversion characteristics designation data; and conversion characteristics setting means for calculating the conversion characteristics data on the basis of the conversion characteristics designation data, and setting the conversion characteristics data in the conversion characteristics storage;

wherein said color converter comprises:

a calculation term generator for receiving the first image data, and outputting calculation terms which are effective just for the specific hues; and a matrix calculator performing matrix calculation using the calculation terms effective just for the specific hues.

With the above arrangement, the user can designate the conversion characteristics by the use of the conversion characteristics designation means. Moreover, where the colors for which the conversion characteristics can be designated by the use of the conversion characteristics designation means and the hues for which the calculation terms generated in the color converter are effective correspond with each other, the calculation of the conversion characteristics data is easy. Moreover, since the color converter performing the color conversion is formed of hardware, a real-time processing of moving pictures can be achieved without placing a heavy load on a CPU. Furthermore, the image data obtained by the color conversion are sent via the image data output circuit to the image display unit, the image after the adjustment is displayed on the image display unit with a size equal as the image before the adjustment, so that the user can designate the conversion characteristics while observing the result of the adjustment.

It may be so arranged that the conversion characteristics designation comprises:

means for selecting the color for which the conversion characteristics is to be designated; and means for designating the conversion characteristics for the selected color.

With the above arrangement, the user can adjust the color without affecting other colors by designating the conversion characteristics of the color which it is desired to adjust, by means of the conversion characteristics designation means.

It may be so arranged that the conversion characteristics data includes matrix calculation coefficients used in said matrix calculator; and said conversion characteristics setting means calculates the conversion characteristics data by adding or subtracting the value corresponding to the values of the conversion characteristics designation data to or from the coefficients among the coefficients for the calculation term effective for the selected color, among the calculation terms effective just for the specific hues.

With the above arrangement, the calculation of the conversion characteristics is easy.

It may be so arranged that means for designating the conversion characteristics for the selected color comprises:

means for selecting one of the two adjacent colors toward which the hue of the selected color is to be shifted; and means for selecting the degree by which the hue of the selected color is to be shifted toward the selected one of the adjacent colors.

With the above arrangement, the user can easily adjust the hue of the desired color, without affecting other colors, by first selecting the color for which the conversion characteristics is to be adjusted, selecting one of the adjacent colors toward which the hue of the selected color is to be shifted, and selecting the degree by which the hue of the selected color is to be shifted toward the selected one of said adjacent hues.

It may be so arranged that the colors for which the conversion characteristics can be designated include red, green and blue, said device comprising means for selecting one of yellow and magenta as said one of the adjacent colors when the selected color is red, for selecting one cyan and yellow as said one of the adjacent colors when the selected color is green, and for selecting one of magenta and yellow as said one of the adjacent colors when the selected color is blue.

With the above arrangement, it is possible to adjust only the desired color among the three colors of red, green and blue.

It may be so arranged that the colors for which the conversion characteristics can be designated include red, yellow, green, cyan, blue, and magenta, said device comprising means for selecting one of yellow and magenta as said one of the adjacent colors when the selected color is red, selecting one of red and green as said one of the adjacent colors when the selected color is yellow, selecting one cyan and yellow as said one of the adjacent colors when the selected color is green, selecting one of green and blue as said one of the adjacent colors when the selected color is cyan selecting one of magenta and yellow as said one of the adjacent colors when the selected color is blue, and selecting one of blue and red as said one of the adjacent colors when the selected color is magenta.

With the above arrangement, it is possible to adjust only the desired color among the six colors of red, yellow, green, cyan, blue, and magenta.

It may be so arranged that the colors for which the conversion characteristics can be designated include skin color, said device comprising means for selecting one of red and yellow as said one of the adjacent colors when the selected color is skin color.

With the above arrangement, it is possible to readily adjust only the skin color.

It may be so arranged that said conversion characteristics designation data include information indicating the color selected by said conversion characteristics designation means;

information indicating the one of the two adjacent colors to which the hue of the selected color is to be shifted; and information indicating the amount by which the hue of the selected color is to be shifted toward the selected one of said adjacent colors.

With the above arrangement, it is possible to generate the conversion characteristics designation data at the conversion characteristics designation means.

It may be so arranged that calculation term generator comprises:

color extracting means for extracting chromatic and achromatic components from the first image data; and a polynomial calculator performing comparison operation on the chromatic components.

With the above arrangement, generation of calculation terms effective just for specific hues is easy.

It may be so arranged that the color extracting means comprises:

a minimum and maximum calculator for calculating a minimum value $\alpha$ and a maximum value $\beta$ of said first image data; and a hue data calculator for calculating hue data r, g, b, y, m and c based on said first image data, and said minimum and maximum values α and β outputted from said minimum and maximum calculator;

said polynomial calculator comprises:

means for generating first comparison-result data based on the hue data outputted from said hue data calculator; and means for generating second comparison-result data based on said first comparison-result data;

said matrix calculator is responsive to said hue data, said first comparison-result data, and said second comparison-result data, and performs matrix calculation using at least said hue data, said first comparison-result data, and said second comparison-result data, in accordance with the conversion characteristics from said coefficient storage.

With the above arrangement, it is possible to independently vary not only the colors of the six hues of red, blue, green, yellow, cyan and magenta, but also the colors in the six inter-hue areas of red-yellow, yellow-green, green-cyan, cyan-blue, blue-magenta, and magenta-red, by independently setting the coefficients relating to the target hue or inter-hue area.

It may be so arranged that the first image data include three color data of red, green and blue, said minimum and maximum calculator determines the minimum and maximum of the three color data R, G and B;

said hue data calculator calculates the hue data r, g, b, y, m, c by subtraction in accordance with:

r=R−α,
g=G−α,
b=B−α.
y=β−B,
m=β−G, and
c=β−R;

said first comparison-result generator generates the first comparison-result data between the hue data r, g, b and y, m, c;

said second comparison-result generator comprises:

multiplying means for multiplying predetermined coefficients with said first comparison-result data; and means for producing the second-comparison result data using the output of the multiplying means.

With the above arrangement, the hue data can be calculated from the input image data R, G and B, and the minimum and maximum value, and the first comparison-result data and the second comparison-result data can be produced by simple operations such as comparison, addition, subtraction, and multiplication.

BRIEF DESCRIPTION OF THE DRAWINGS

In the accompanying drawings:

FIG. 13A and FIG. 13B are tables showing the relationship between respective hues or inter-hue areas, and effective calculation terms or data which relate to and are effective for each hue or inter-hue area;

FIG. 18 shows an example of menu displayed on the screen of an image display unit in Embodiment 4;

DETAILED DESCRIPTION OF THE PREFERRED EMBODIMENTS

The invention will now be described with reference to the drawings.

Embodiment 1

Figure 1:
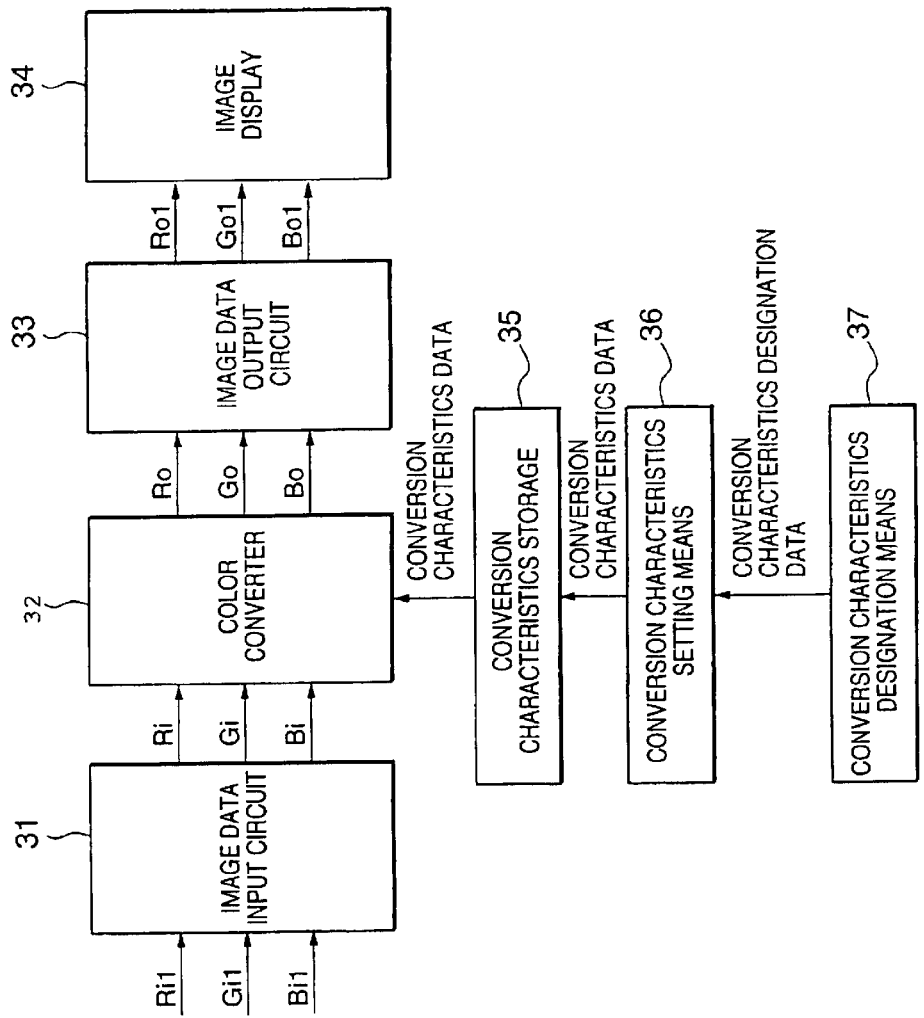
FIG. 1 is a block diagram showing an example of configuration of an image display device of Embodiment 1.

FIG. 1 is a block diagram showing an example of configuration of an image display device of this embodiment. In the drawing, reference numeral 31 denotes an image data input circuit, 32 denotes a color converter, 33 denotes an image data output circuit, 34 denotes an image display unit, 35 denotes a conversion characteristics storage, 36 denotes a conversion characteristics setting means and 37 denotes a conversion characteristics designation means.

The operations of the image display device shown in FIG. 1 will next be described. Image data Ri1, Gi1 and Bi1 comprising three color data are inputted to the image data input circuit 31. The image data input circuit 31 performs input image processing on the inputted image data, to produce image data Ri, Gi and Bi comprising three color data. The input image processing performed at the image data input circuit 31 may be conversion of the number of pixels, or tone correction, according to the characteristics of the input image data. The image data Ri, Gi and Bi outputted from the image data input circuit 31 are inputted to the color converter 32. The color converter 32 performs color conversion on the inputted or first image data (input or first set of three color data) Ri, Gi and Bi, using the color characteristics data stored in the conversion characteristics storage 35, to produce another or second image data (output or second set of three color data) Ro, Go and Bo.

The second image data Ro, Go and Bo outputted from the color converter 32 are inputted to the image data output circuit 33. The image data output circuit 33 performs output image processing on the image data Ro, Go and Bo to produce image data Ro1, Go1 and Bo1, which are sent to the image display unit 34, which displays an image. The output image processing may be conversion of data format, or tone correction according to the characteristics of the image display unit 34.

The image display unit 34 may for example be a liquid crystal panel display device, or a CRT (cathode ray tube) display device.

The user can designate the desired conversion characteristics using the conversion characteristics designation means 37. The conversion characteristics designation means 37 generates conversion characteristics designation data on in compliance with the designation by the user. The conversion characteristics designation data from the conversion characteristics designation means 37 is input to the conversion characteristics setting means 36.

The conversion characteristics setting means 36 calculates the conversion characteristics data from the input conversion characteristics designation data, and sets the conversion characteristics data in the conversion characteristics storage 35.

The conversion characteristics designation means 37 can be implemented by the menus displayed on the screen of the image display unit 34 and the keys provided on the image display unit 34. In this case, the user can designate the desired conversion characteristics by selecting the options in the menus displayed on the screen of the image display unit 34, by means of the keys. As an alternative, the conversion characteristics designation means 37 may be implemented by a dedicated control panel, or the input devices such as a mouse and a keyboard. Here, it is assumed that the conversion characteristics designation means 37 is formed of menus displayed on the screen of the image display unit 34 and the keys provided on the image display unit 34.

Figure 2:
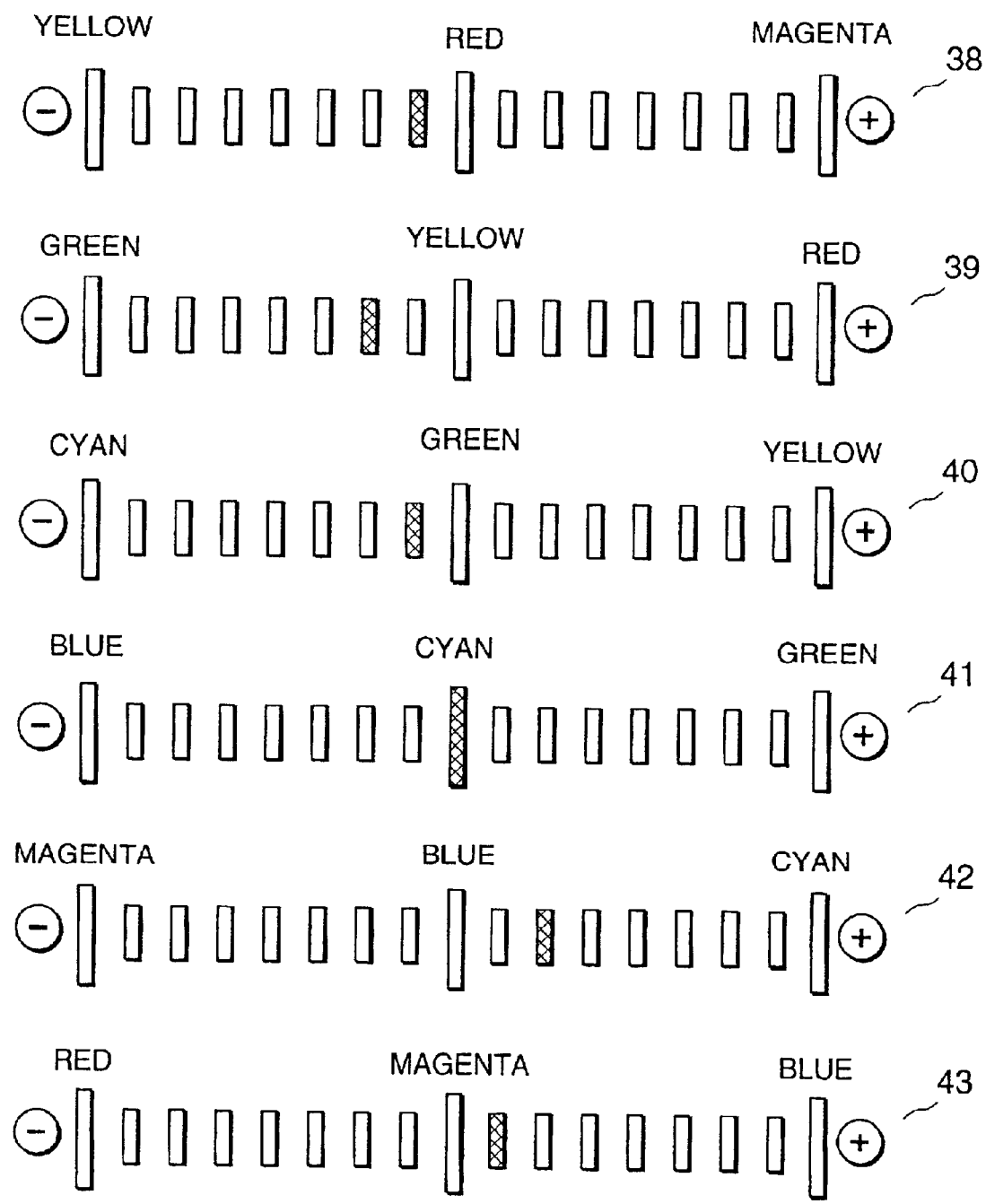
FIG. 2 shows an example of menus displayed on the screen of the image display device.

FIG. 2 shows an example of menu displayed on the screen of the image display unit 34.

In FIG. 2, reference numeral 38 denotes a red hue adjustment bar, 39 denotes a yellow hue adjustment bar, 40 denotes a green hue adjustment bar, 41 denotes a cyan hue adjustment bar, 42 denotes a blue hue adjustment bar, and 43 denotes a magenta hue adjustment bar.

By using the keys provided on the image display unit 34, the user selects one of the red hue adjustment bar 38, yellow hue adjustment bar 39, green hue adjustment bar 40, cyan hue adjustment bar 41, blue hue adjustment bar 42, and magenta hue adjustment bar 43 that corresponds to the color for which the hue is to be adjusted, i.e., the conversion characteristics is to be changed. The selected hue adjustment bar lets the user know that it has been selected, by varying its hue or brightness. When the selection of the desired hue adjustment bar is completed, the user then designates the hue of the selected color. The designation of the hue is performed by selecting one of the two adjacent colors to which the hue of the selected color is to be shifted, and how far the hue of the selected color is to be shifted.

By repeating the above-outlined operation, the user can designate the desired color conversion characteristics. In the example of FIG. 2, the designated conversion characteristics is such that the hue of red is shifted toward yellow by one step, the hue of yellow is shifted toward green by two steps, the hue of green is shifted toward cyan by one step, the hue of blue is shifted toward cyan by two steps, and the hue of magenta is shifted toward blue by one step.

Figure 3:
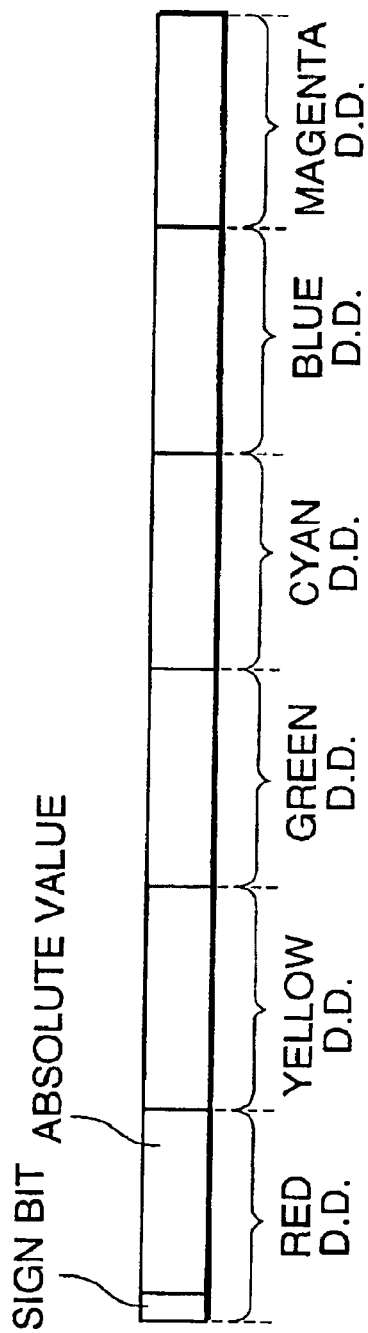
FIG. 3 shows an example of configuration of conversion characteristics designation data used for the image display device of Embodiment 1.

The conversion characteristics designation means 37 generates the conversion characteristics designation data in accordance with the values of the red hue adjustment bar 38, yellow hue adjustment bar 39, green hue adjustment bar 40, cyan hue adjustment bar 41, blue hue adjustment bar 42 and magenta hue adjustment bar 43. FIG. 3 shows an example of configuration of the conversion characteristics designation data. In the example shown in FIG. 3, the conversion characteristics designation data comprises red designation data (RED D. D.), yellow designation data (YELLOW D. D.), green designation data (GREEN D. D.), cyan designation data (CYAN D. D.), blue designation data (BLUE D. D.) and magenta designation data (MAGENTA D. D.) which are 1arranged in the stated order. The designation data for each color comprises a sign bit and an absolute value. The sign bit indicates which of the adjacent colors the hue of each color (color in question) is to be shifted. The absolute value of the designation data indicates the degree by which the hue of each color is to be shifted.

With respect to the colors that are not adjusted by the user, the value of each designation data is 1.0.

When the designation is as shown in FIG. 2, the red designation data is "−1," the yellow designation data is "−2," the green designation data is "−1," the cyan designation data is "+0," the blue designation data is "+2," and the magenta designation data is "+1."

The conversion characteristics setting means 36 calculates the conversion characteristics data on the basis of the conversion characteristics designation data from the conversion characteristics designation means 37, and sets them in the conversion characteristics storage 35. The conversion characteristics data is referred to by the color converter 32 when it performs the color conversion. When the color converter 32 is configured as a color converter of the matrix calculation type, the conversion characteristics data include coefficient used in the matrix calculation.

Figure 4:
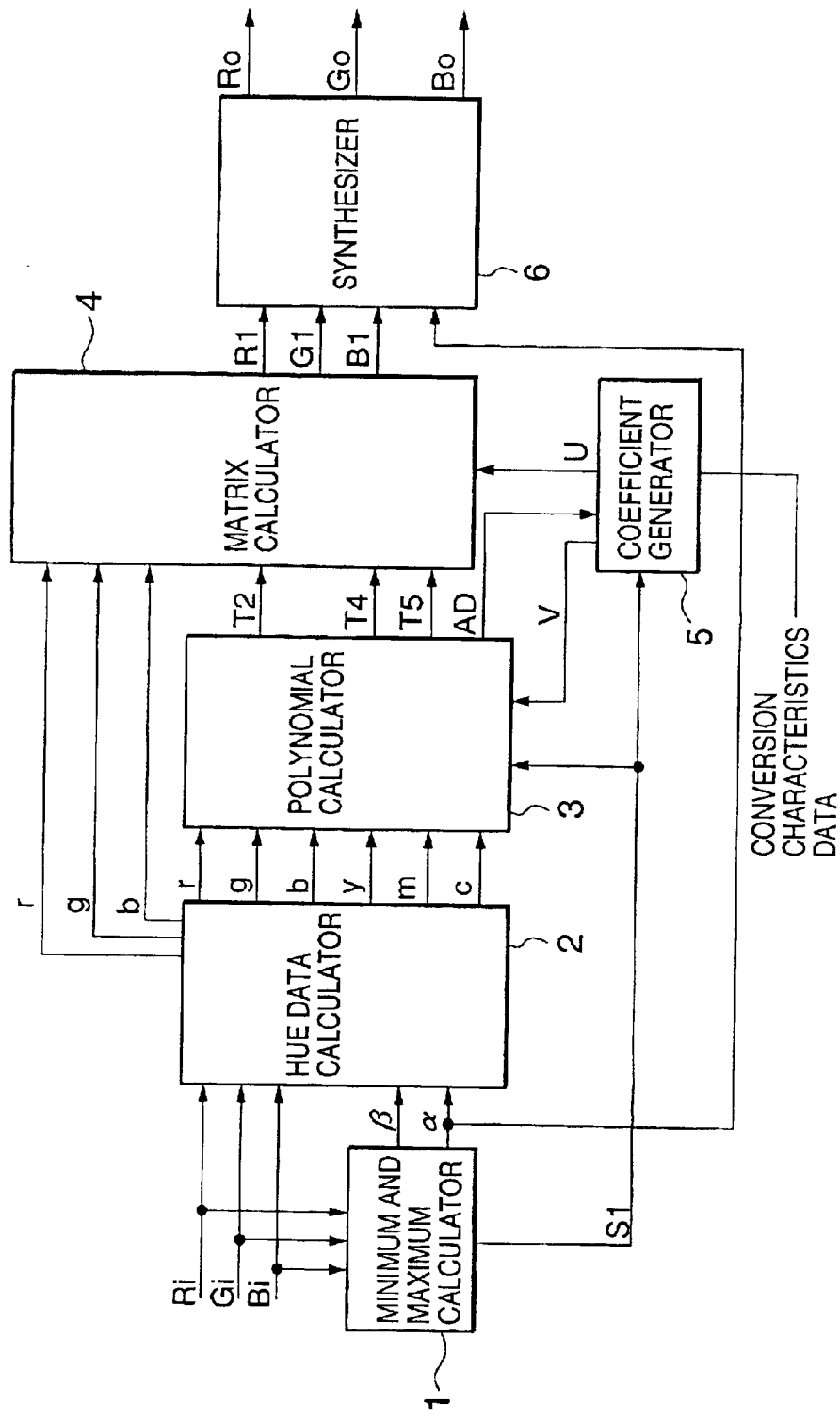
FIG. 4 is a block diagram showing an example of configuration of a color converter in the image display device of Embodiment 1.

FIG. 4 is a block diagram showing an example of the configuration of the color converter 32. The illustrated color converter is for converting the first image data (the first set of three color data) representing red, green and blue, denoted by Ri, Gi and Bi, into the second image data (second set of three color data), also representing red, green and blue, denoted by Ro, Go and Bo. A minimum and maximum calculator 1 calculates a maximum value $\beta$ and a minimum value $\alpha$ of the inputted image data Ri, Gi and Bi, and generates and outputs an identification code S1 for indicating, among the six hue data, data which are zero, as will be better understood from the following description. A hue data calculator 2 calculates hue data r, g, b, y, m and c from the image data Ri, Gi and Bi and the outputs from the minimum and maximum calculator 1. The color converter further comprises a polynomial calculator 3, a matrix calculator 4, a coefficient generator 5, and a synthesizer 6.

The matrix calculator 4 is of the matrix calculation type, and the conversion characteristics data inputted to the coefficient generator 5 include calculation coefficients for the matrix calculation.

Figures 5, 6:
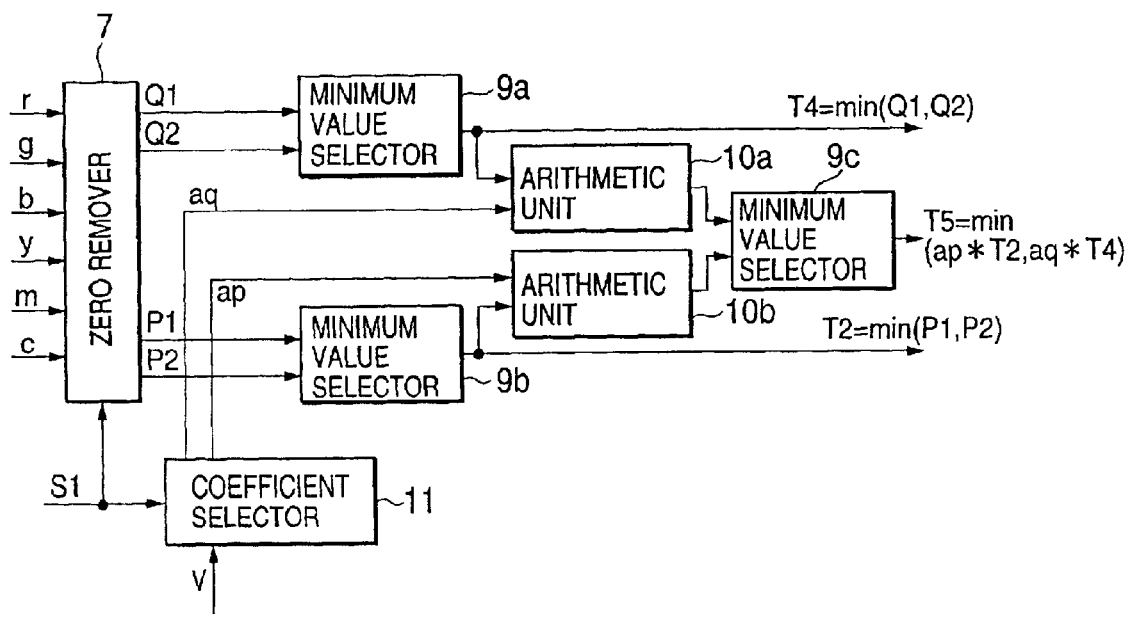
FIG. 5 is a block diagram showing an example of configuration of a polynomial calculator in the color converter in the image display device of Embodiment 1.
FIG. 6 is a table showing an example of the relationship between an identification code S1, and the maximum and minimum values β and α, and hue data whose value is zero, in the color converter in the image display device of Embodiment 1.

FIG. 5 is a block diagram showing an example of configuration of the polynomial calculator 3. In FIG. 5, a zero remover 7 removes, from the inputted hue data, data which are of value zero. Minimum selectors 9a, 9b and 9c select and output the minimum of the input data. A calculation coefficient selector 11 selects from among the coefficients supplied from the coefficient generator 5, and outputs the selected coefficients as calculation coefficients based on the identification code S1 from the minimum and maximum calculator 1.

The selector 11 receives the signals aq1 to aq6, and ap1 to ap6, and selects one of aq1 to aq6, and one of ap1 to ap6, in accordance with the value of S1. The relationship between the selected ones of aq1 to aq6 and ap1 to ap6, and the value of S1 is as follows:

S1  aq   ap
0   aq1  ap1
1   aq2  ap2
2   aq3  ap3
3   aq4  ap4
4   aq5  ap5
5   aq6  ap6

The selector 11 having the function described above can be formed of logic circuits.

Arithmetic units 10a and 10b perform multiplication between the calculation coefficients represented by the outputs of the calculation coefficient selector 11 and the outputs from the minimum selectors 9a and 9b.

Next, the operation will be described. The inputted image data Ri, Gi and Bi corresponding to the three colors of red, green and blue are sent to the minimum and maximum calculator 1 and the hue data calculator 2. The minimum and maximum calculator 1 calculates and outputs a maximum value β and a minimum value α of the inputted image data Ri, Gi and Bi, and also generates and outputs an identification code S1 for indicating, among the six hue data, data data which are zero.

The hue data calculator 2 receives the inputted image data Ri, Gi and Bi and the maximum and minimum values β and α from the minimum and maximum calculator 1, performs subtraction of r=Ri−α,
g=Gi−α,
b=Bi−α,
y=β−Bi,
m=β−Gi, and
c=β−Ri, and outputs six hue data r, g, b, y, m and c thus obtained.

The maximum and minimum values β and α calculated by the minimum and maximum calculator 1 are respectively represented as follows:

β=MAX (Ri, Gi, Bi)
α=MIN (Ri, Gi, Bi)

Since the six hue data r, g, b, y, m and c calculated by the hue data calculator 2 are obtained by the subtraction of r=Ri−α,
g=Gi−α,
b=Bi−α,
y=β−Bi,
m=β−Gi, and
c=β−Ri, at least two among these six hue data are of a value zero. For example, if a maximum value β is Ri and a minimum value α is Gi (β=Ri, and α=Gi), g=0 and c=0. If a maximum value β is Ri and a minimum value α is Bi (β=Ri, and α=Bi), b=0 and c=0. In other words, in accordance with a combination of Ri, Gi and Bi which are the largest and the smallest, respectively, one of r, g and b, and one of y, m and c, i. e., in total two of them have a value zero.

Thus, in the foregoing minimum and maximum calculator 1, the identification code S1 for indicating, among the six hue data which are zero are generated and outputted. The identification code S1 can assume one of the six values, depending on which of Ri, Gi and Bi are of the maximum and minimum values β and α. FIG. 6 shows a relationship between the values of the identification code S1 and the maximum and minimum values β and α of Ri, Gi and Bi and hue data which has a value zero. In the drawing, the values of the identification code S1 represent just an example, and the values may be other than those shown in the drawing.

Then, the six hue data r, g, b, y, m and c outputted from the hue data calculator 2 are sent to the polynomial calculator 3, and the hue data r, g and b are also sent to the matrix calculator 4. The polynomial calculator 3 also receives the identification code S1 outputted from the minimum and maximum calculator 1, and performs calculation by selecting, from the hue data r, g and b, two data Q1 and Q2 which are not of a value zero, and from the hue data y, m and c, two data P1 and P2 which are not of a value zero. Next, this operation will be described by referring to FIG. 5.

Figures 7, 8:
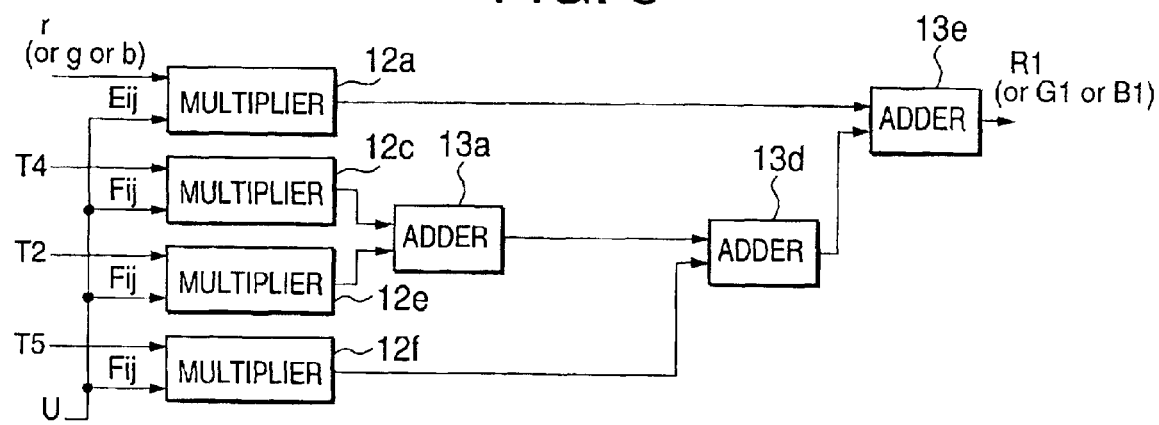
FIG. 7 is a table showing the operation of a zero remover of the polynomial calculator in the color converter in the image display device of Embodiment 1.
FIG. 8 is a block diagram showing an example of configuration of a matrix calculator in the color converter in the image display device device of Embodiment 1.

The hue data from the hue data calculator 2 and the identification code S1 from the minimum and maximum calculator 1 are inputted to the zero remover 7 in the polynomial calculator 3. The zero remover 7 outputs, based on the identification code S1, the two data Q1 and Q2 which are not of a value zero, among the hue data r, g and b and the two data P1 and P2 which are not of a value zero, among the hue data y, m and c. For instance, Q1, Q2, P1 and P2 are determined as shown in FIG. 7, and then outputted. If, for example, the identification code S1 is of a value zero, Q1 and Q2 are obtained from the hue data r and b, and P1 and P2 are obtained from the hue data y and m, so the outputs are given by Q1=r, Q2=b, P1=m and P2=y. As in the case of FIG. 6, the values of the identification code S1 in FIG. 7 represent just an example, and may be other than those shown in FIG. 7.

The minimum selector 9a selects and outputs the minimum value T4=min (Q1, Q2) among the output data Q1 and Q2 from the zero remover 7. The minimum selector 9b selects and outputs the minimum value T2=min (P1, P2) among the output data P1 and P2 from the zero remover 7. The outputs of the minimum selectors 9a and 9b are the first comparison-result data.

The identification code S1 is inputted from the minimum and maximum calculator 1 to the calculation coefficient selector 11, which selects signals indicating calculation coefficients aq and ap from among the signals generated by the coefficient generator 5, the selection being made based on the identification code S1, and the coefficient aq is supplied to the arithmetic unit 10a, and the coefficient ap is supplied to the arithmetic unit 10b. These calculation coefficients aq and ap are used for multiplication with the comparison-result data T4 and T2, and each of the calculation coefficients aq and ap can assume one of the six values, corresponding to the value of the identification code S1 shown in FIG. 7.

The arithmetic unit 10a receives the comparison-result data T4 from the minimum selector 9a, performs multiplication of aq*T4, and sends the result to the minimum selector 9c. The arithmetic unit 10b receives the comparison-result data T2 from the minimum selector 7, performs multiplication of ap*T2, and sends the result to the minimum selector 9c.

The minimum selector 9c selects and outputs the minimum value T5=min (aq*T2, ap*T4) of the outputs the arithmetic units 10a and 10b. The output of the minimum value selector 9c is a second comparison-result data.

The polynomial data T2, T4 and T5 outputted from the polynomial calculator 3 are supplied to the matrix calculator 4.

The coefficient generator 5 shown in FIG. 4 selects the calculation coefficients U(Fij) and the fixed coefficients U(Eij) for the polynomial data, from among the conversion characteristics data stored in the conversion characteristics storage 35, in accordance with the identification code S1, and outputs the selected coefficients to the matrix calculator 4.

The coefficient generator 5 can be formed of logic circuits as is the selector 11.

The matrix calculator 4 receives the hue data r, g and b from the hue data calculator 2, the polynomial data T2, T4 and T5 from the polynomial calculator 3 and the coefficients U from the coefficient generator 5, and outputs the results of calculation according to the following formula (1) as image data R1, G1 and B1.

$$\begin{bmatrix} R1 \\ G1 \\ B1 \end{bmatrix} = (Eij)\begin{bmatrix} r \\ g \\ b \end{bmatrix} + (Fij)\begin{bmatrix} T2 \\ T4 \\ T5 \end{bmatrix} \quad (1)$$

In the formula (1), for (Eij), i=1 to 3 and j=1 to 3, and for (Fij), i=1 to 3 and j=1 to 3.

FIG. 8, which is a block diagram, shows an example of configuration of part of the matrix calculator 4. Specifically, it shows how R1 is calculated and outputted. As shown in FIG. 8, the matrix calculator 4 includes multipliers 12a, 12c, 12e and 12f, and adders 13a, 13d and 13e interconnected as illustrated.

Next, the operation of the matrix calculator 4 of FIG. 8 will be described. The multipliers 12a, 12c, 12e and 12f receive the hue data r, the polynomial data T2, T4 and T5 from the polynomial calculator 3 and the coefficients U(Eij) and U(Fij) from the coefficient generator 5, and then output the products thereof. The adder 13a receives the products outputted from the multipliers 12c and 12e, adds the inputted data and outputs the sum thereof. The adder 13d adds the output from the adder 13a and the product outputted from the multiplier 12f. The adder 13e adds the output from the adder 13d and the output (product) from the multiplier 12a, and outputs the sum total thereof as image data R1. In the example of configuration shown in FIG. 8, if the hue data r is replaced by the hue data g or b, and coefficients suitable for the respective terms (data) T2, T4 and T5 are used in substitution, image data G1 or B1 can be calculated.

Where it is desired to increase the calculation speed of the color converter 32, since parts of the coefficients (Eij) and (Fij) which respectively correspond to the hue data r, g and b are used, the configurations each as shown in FIG. 8 may be used in parallel, so as to perform the matrix calculation at a higher speed.

The synthesizer 6 receives the image data R1, G1 and B1 from the matrix calculator 4 and the minimum value α outputted from the minimum and maximum calculator 1 representing the achromatic data, performs addition, and outputs image data Ro, Go and Bo. The equation used for obtaining the image data color-converted by the color-conversion method of FIG. 4 is therefore given by the following formula (2).

$$\begin{bmatrix} Ro \\ Go \\ Bo \end{bmatrix} = (Eij)\begin{bmatrix} r \\ g \\ b \end{bmatrix} + (Fij)\begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (2)$$

Here, for (EiJ), i=1 to 3 and j=1 to 3, and for (Fij), i=1 to 3 and j=1 to 12, and
h1r=min (m, y),
h1g=min (y, c),
h1b=min (c, m),
h1c=min (g, b),
h1m=min (b, r),
h1y=min (r, g),
h2ry=min (aq1*h1y, ap1*h1r),
h2rm=min (aq2*h1m, ap2*h1r),
h2gy=min (aq3*h1y, ap3*h1g),
h2gc=min (aq4*h1c, ap4*h1g),
h2bm=min (aq5*h1m, ap5*h1b), and
h2bc=min (aq6*h1c, ap6*h1b),
and aq1 to aq6 and ap1 to ap6 indicate calculation coefficients selected by the calculation coefficient selector 11 of FIG. 5.

The difference between the number of calculation terms in the formula (2) and the number of calculation terms in FIG. 4 is that FIG. 4 shows a method of calculation for each pixel excluding the calculation terms which are of a value zero, while the formula (2) represents a general formula for a set of pixels. In other words, twelve polynomial data for one pixel of the formula (2) can be reduced to three effective data, and this reduction is achieved by exploiting a characteristic of the hue data.

The combination of effective data is changed according to image data of the target pixel. For all image data, all the polynomial data can be effective.

Figure 9A:
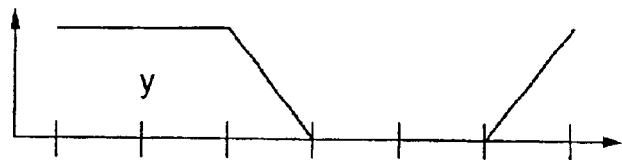
FIG. 9A to FIG. 9F are diagrams schematically showing the relationship between six hues and hue data.
Figure 9B:
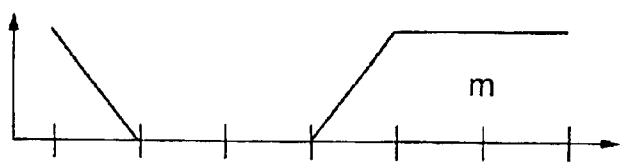
Figure 9C:
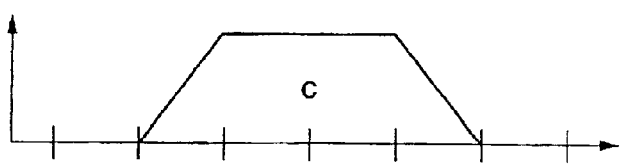
Figure 9D:
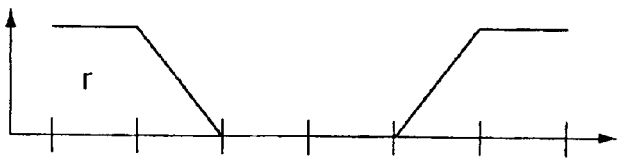
Figure 9E:
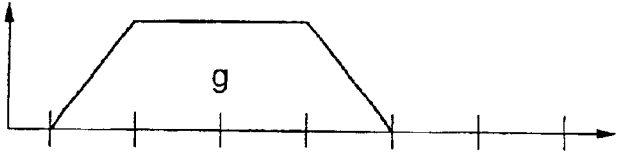
Figure 9F:
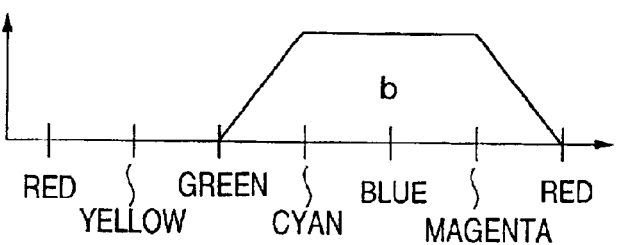
Figure 10A:
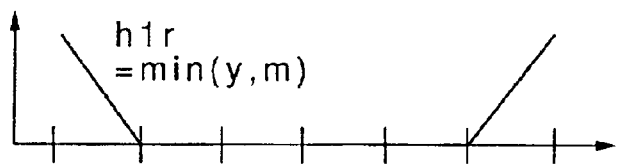
FIG. 10A to FIG. 10F are diagrams schematically showing the relationship between six hues and first comparison-result data in the color conversion device of Embodiment 1.
Figure 10B:
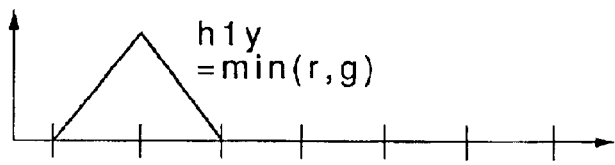
Figure 10C:
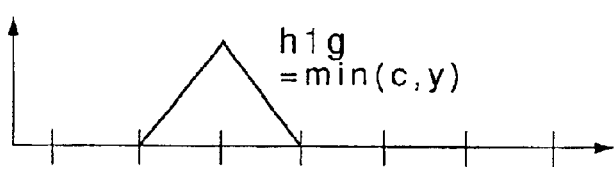
Figure 10D:
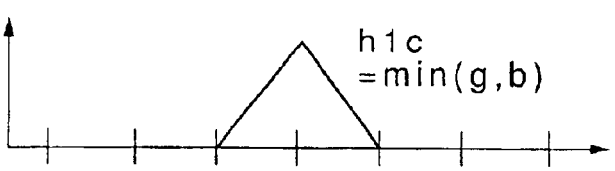
Figure 10E:
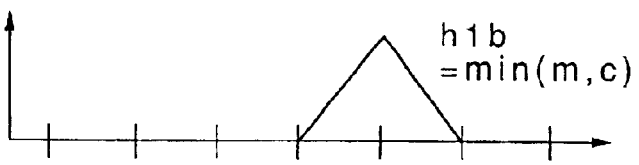
Figure 10F:
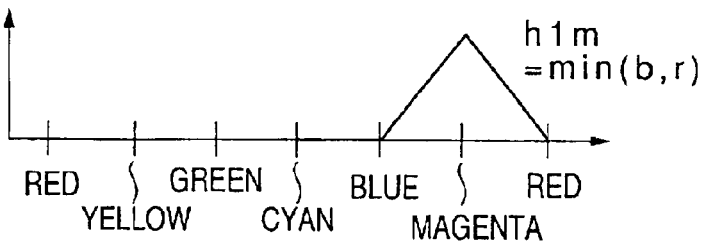
Figure 11A:
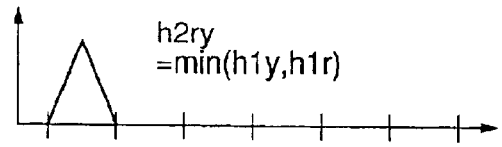
FIG. 11A to FIG. 11F are diagrams schematically showing the relationship between six inter-hue areas and second comparison-result data in the color converter in the image display device of Embodiment 1.
Figure 11B:
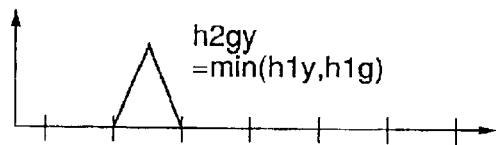
Figure 11C:
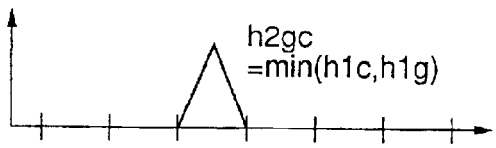
Figure 11D:
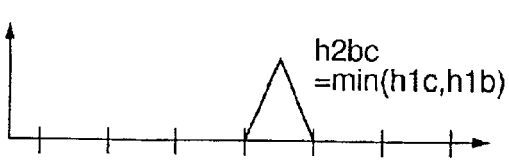
Figure 11E:
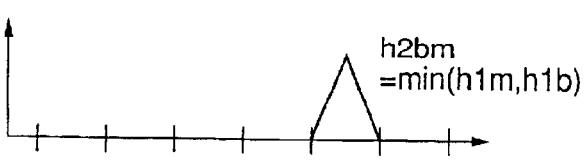
Figure 11F:
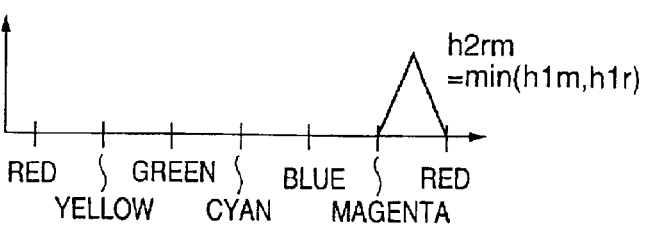
Figure 12A:
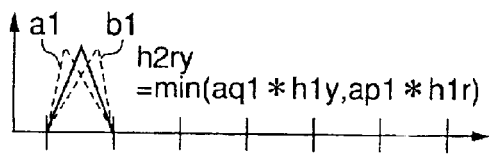
FIG. 12A to FIG. 12F are diagrams schematically showing how the range of each inter-hue area is changed with the change of the coefficients multiplied at the polynomial calculator is changed.
Figure 12B:
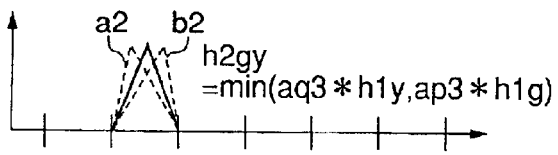
Figure 12C:
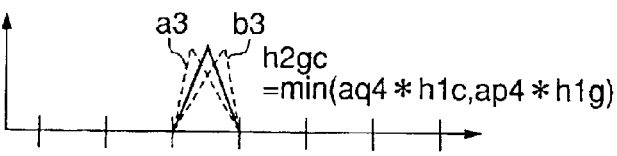
Figure 12D:
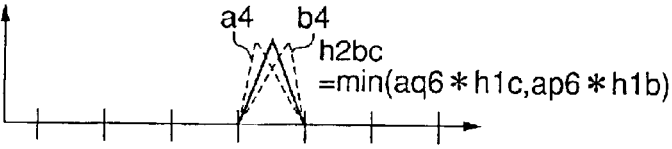
Figure 12E:
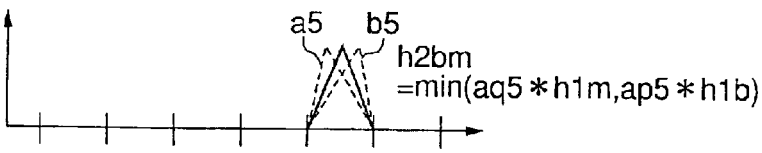
Figure 12F:
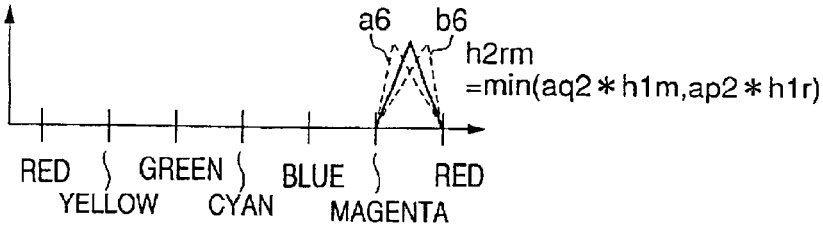

FIG. 9A to FIG. 9F schematically show relations between the six hues (red, yellow, green, cyan, blue, magenta) and the hue data y, m, c, r, g and b. Each hue data relates to, i.e., extends to cover the range of three hues. For example, y as shown in FIG. 9A relates to, or extends to cover three hues of red, yellow and green.

Each of the foregoing formulae (1) and (2) includes a first comparison-result data effective only for one hue. The first comparison-result data are:
h1r=min (y, m),
h1y=min (r, g),
h1g=min (c, y),
h1c=min (g, b),
h1b=min (m, c), and
h1m=min (b, r).

FIG. 10A to FIG. 10F schematically show relations between the six hues and first comparison-result data h1r, h1y, h1g, h1c, h1b, and h1m. It is seen that each of the first comparison-result data relates to only one specific hue.

For instance, if W is a constant, for red, r=W, g=b=0, so that y=m=W, and c=0. The other five first comparison-result data are all of a value zero. That is, for red, h1r=min (y, m) alone is the only effective first comparison-result data. Similarly, h1g=min (c, y) is the only effective first comparison-result data for green; h1b=min (m, c) for blue; h1c=min (g, b) for cyan; h1m=min (b, r) for magenta; and h1y=min (r, g) for yellow.

FIG. 11A to FIG. 11F schematically show relations between the six hues and second comparison-result data:

h2ry=min (h1y, h1r),
h2gy=min (h1y, h1g),
h2gc=min (h1c, h1g),
h2bc=min (h1c, h1b),
h2bm=min (h1m, h1b), and
h2rm=min (h1m, h1r).

This is the case in which the coefficients aq1 to aq6 and ap1 to ap6 in h2ry=min (aq1*h1y, ap1*h1r),
h2rm=min (aq2*h1m, ap2*h1r),
h2gy=min (aq3*h1y, ap3*h1g),
h2gc=min (aq4*h1c, ap4*h1g),
h2bm=min (aq5*h1m, ap5*h1b), and
h2bc=min (aq6*h1c, ap6*h1b), in the formula (1) above are all of a value "1".

It can be understood from FIG. 11A to FIG. 11F, that each of the second comparison-result data relates to changes in the six inter-hue areas of red-green, yellow-green, green-cyan, cyan-blue, blue-magenta, and magenta-red. In other words, for red-yellow, b=c=0, and the five terms other than h2ry=min (h1y, h1r)=min (min (r, g), min (y, m)) are all zero.

Accordingly, only h2ry is an effective second comparison-result data for red-yellow. Similarly, only h2gy is an effective second comparison-result data for yellow-green; h2gc for green-cyan; h2bc for cyan-blue; h2bm for blue-magenta; and h2rm for magenta-red.

FIG. 12A to FIG. 12F schematically show how the range of the six inter-hue area to which each of the second comparison-result data relate is changed when the coefficients aq1 to aq6 and ap1 to ap6 used for determination of h2ry, h2rm, h2gy, h2gc, h2bm and h2bc according to the foregoing formulae (6) and (1) are changed. The broken lines a1 to a6 shows the characteristics when aq1 to aq6 assume values larger than ap1 to ap6. The broken lines b1 to b6 shows the characteristics when ap1 to ap6 assume values larger than aq1 to aq6.

Specifically, for inter-hue area red-yellow, only h2ry min (aq1*h1y, ap1*h1r) is an effective second comparison-result data. If, for example, the ratio between aq1 and ap1 is 2:1, the peak value of the second comparison-result data is shifted toward red, as indicated by the broken line a1 in FIG. 12A, and thus it can be made an effective comparison-result data for an area closer to red in the inter-hue area of red-yellow. On the other hand, for example if the ratio between aq1 and ap1 is 1:2, the relationship is like that indicated by the broken line b1 in FIG. 12A, the peak value of the second comparison-result data is shifted toward yellow, and thus it can be made an effective comparison-result data for an area closer to yellow in the inter-hue area of red-yellow. Similarly, by respectively changing:

aq3 and ap3 in h2gy for yellow-green,
aq4 and ap4 in h2gc for green-cyan,
aq6 and ap6 in h2bc for cyan-blue,
aq5 and ap5 in h2bm for blue-magenta and
aq2 and ap2 in h2rm for magenta-red, the area for which each second comparison-result data is most effective can be changed.

FIG. 13A and FIG. 13B respectively show relations between the six hues and inter-hue areas and effective calculation terms. Thus, if the coefficients from among the conversion characteristics data, i.e., the calculation coefficients from the conversion characteristics storage 35, which are for a calculation term effective for a hue or an inter-hue area to be adjusted are changed, only the target hue or inter-hue area can be adjusted.

Further, if coefficients selected by the calculation coefficient selector 11 in the polynomial calculator 3 are changed, part of the inter-hue area where a calculation term in the inter-hue area is most effective can be changed without giving any influence to the other hues.

Figure 14:
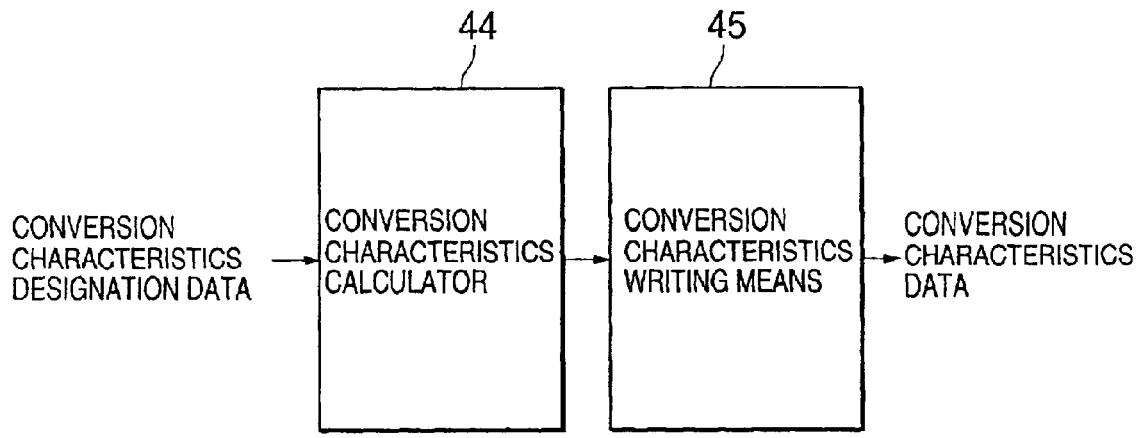
FIG. 14 is a block diagram showing an example of configuration of conversion characteristics designation means in the image display device of Embodiment 1.

When the color converter 32 is configured as described above, the conversion characteristics storage 35 stores the conversion characteristics data as the calculation coefficients. FIG. 14 is a block diagram showing an example of configuration of the conversion characteristics setting means 36. In FIG. 14, reference numeral 44 denotes a conversion characteristics calculator, and 45 denotes a conversion characteristics writing means 45. The conversion characteristics designation data from the conversion characteristics designation means 37 are inputted to the conversion characteristics calculator 44. The conversion characteristics calculator 44 calculates the conversion characteristics data in accordance with the inputted conversion characteristics designation data. The conversion characteristics data outputted from the conversion characteristics calculator 44 are written into the conversion characteristics storage 35 by means of the conversion characteristics writing means 45.

The color converter 32 uses calculation terms each of which is effective for just one of the six hues or just one of the six inter-hue areas. If the coefficient for the calculation term that is effective just for a hue or inter-hue area that is to be adjusted, the particular hue of inter-hue area can be adjusted, without affecting the activities of others. The conversion characteristics calculator 44 calculates the coefficients for each of the calculation term effective for the hue or inter-hue area for which the conversion characteristics has been designated, in accordance with the contents or values of the conversion characteristics designation data from the conversion characteristics designation means 37.

For instance, if it is designated that the hue of red is to be shifted toward yellow by one step, the coefficients for the first comparison-result data h1r effective for red are newly calculated. The coefficients for h1r includes a coefficient for calculating R1, a coefficient for calculating G1 and a coefficient for calculating B1. If the hue of red is set to be shifted toward yellow by one step, the coefficients for h1r can be calculated in the following manner. That is, a value corresponding to the absolute value of the red designation data, of the conversion characteristics designation data shown in FIG. 3, is added to the coefficient for calculating G1, of the coefficients for h1r, or is subtracted from the coefficient for calculating B1, of the coefficients for h1r.

When the conversion characteristics designation means 37 has the menu as shown in FIG. 2, and the color converter 32 is of the configuration shown in FIG. 4, the conversion characteristics calculator 44 newly calculates the coefficients for h1r responsive to designation by means of red hue adjustment bar 38, the coefficients for h1y responsive to designation by means of yellow hue adjustment bar 39, the coefficients for h1g responsive to designation by means of green hue adjustment bar 40, the coefficients for h1c responsive to designation by means of cyan hue adjustment bar 41, the coefficients for h1b responsive to designation by means of blue hue adjustment bar 42, and the coefficients for h1m responsive to designation by means of magenta hue adjustment bar 43.

As described above, if the colors for which the conversion characteristics can be designated by the conversion characteristics designation means 37 and the hues which can be independently adjusted by the color converter 32 are identical, then the calculation of the conversion characteristics data is easy.

The coefficients for the second comparison-result data h2ry, h2gy, h2gc, h2bc, h2bm, and h2rm can be determined on the basis of the coefficients for the first comparison-result data. As an alternative, the coefficients for the second comparison-result data can be calculated directly from the conversion characteristics data. The conversion characteristics designation means 37 newly calculates the values of these coefficients as required.

In Embodiment 1, the color converter 32 is of such a configuration that performs matrix calculation using the first and second comparison-result data. The color converter may be of a different configuration. The conversion characteristics storage may be a random access memory, so-called registers, or any other device in which the desired values can be set. The image data input circuit 31 and the image output circuit 33 are not indispensable, and may be omitted when input image processing or output image processing is not required.

In Embodiment 1, the conversion characteristics were designated using the six hue adjustment bars—the red hue adjustment bar 38, the yellow hue adjustment bar 39, green hue adjustment bar 40, cyan hue adjustment bar 41, blue hue adjustment bar 42 and magenta hue adjustment bar 43. However, where it is not necessary to designate the conversion characteristics separately for the respective colors, and it is only required to designate identical conversion characteristics for all the colors, the values of the six hue adjustment bars will be identical. For instance, in the menu shown in FIG. 2, when it is designated to shift the hue of red toward yellow by one step, the hue of yellow toward green by one step, the hue of green toward cyan by one step, the hue of cyan toward blue by one step, the hue of blue toward magenta by one step, and the hue of magenta toward red by one step, the values of all the six hue adjustment bars will be identical. In such a case, a single hue adjustment bar may be used in substitution for the six hue adjustment bars.

As has been described, an image display device can be obtained by which it is possible to adjust the hue of the color which it is desired to adjust, without affecting other colors, by allowing a user to designate the conversion characteristics of the color which is to be adjusted by means of the conversion characteristics designation means.

Moreover, the color converter can be configured of hardware. Accordingly, an image display device can be obtained which can operate on a real-time basis responsive to moving pictures, without placing an excessive load on a CPU.

Furthermore, the image data obtained after the color conversion can be sent to the image display unit via the image data output circuit, so that the image after the adjustment can be displayed on a real-time basis, with a size equal to the original image (image before the adjustment).

Embodiment 2

Figure 15:
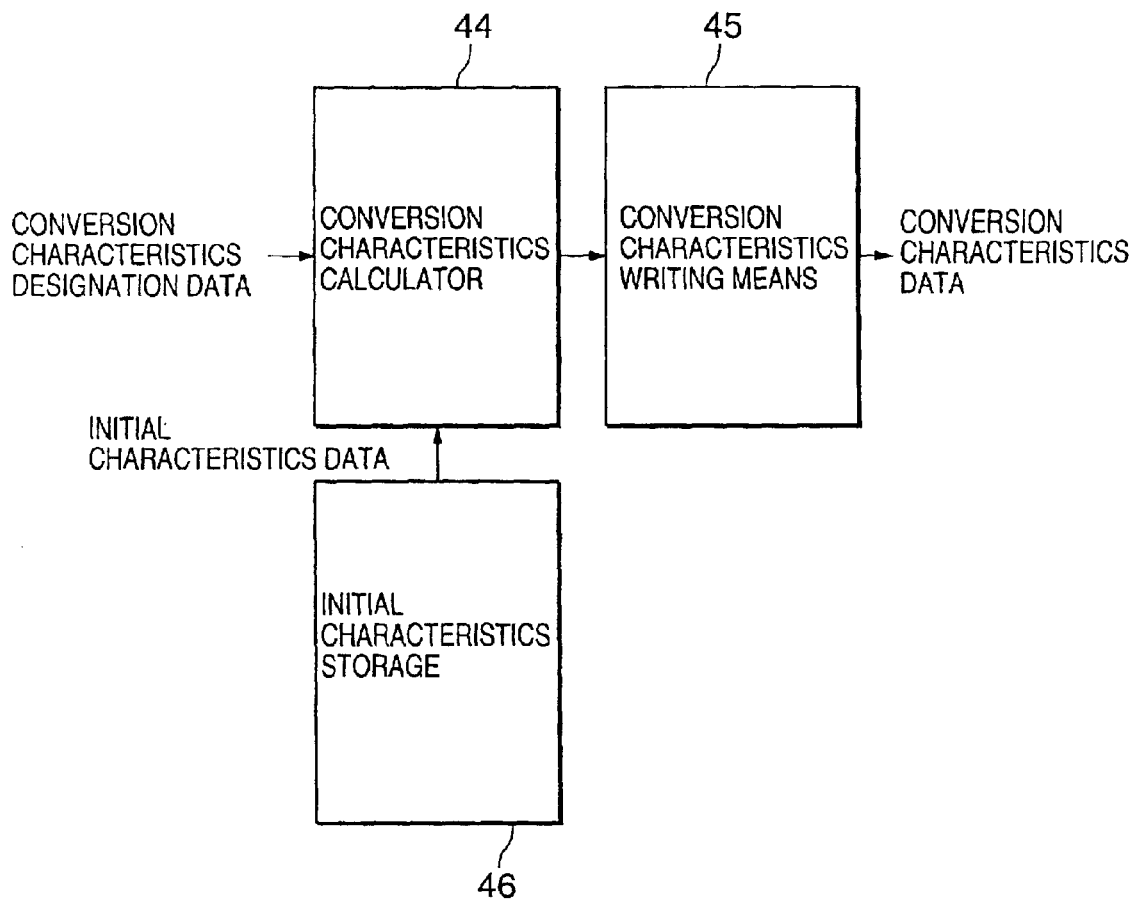
FIG. 15 is a block diagram showing an example of configuration of conversion characteristics designation means in the image display device of Embodiment 2.

FIG. 15 is a block diagram showing an example of configuration of a conversion characteristics setting means 36 of Embodiment 2. In the drawing, reference numerals 44 and 45 denote members identical to those shown in FIG. 14. Reference numeral 46 denotes an initial characteristics storage. In this embodiment, the conversion characteristics calculator 44 calculates the conversion characteristics data on the basis of the initial characteristics data from the initial characteristics storage 46 as well as the conversion characteristics designation data from the conversion characteristics designation means 37. The rest of the configuration is identical to that of Embodiment 1.

As in Embodiment 1, where the color converter 32 is configured as shown in FIG. 4, the conversion characteristics data are stored as the calculation coefficients in the conversion characteristics storage 35. The conversion characteristics designation data from the conversion characteristics designation means 37 are inputted to the conversion characteristics calculator 44. Also supplied to the conversion characteristics calculator 44 are the initial characteristics data from the initial characteristics storage 46. Stored in the initial characteristics storage 46 are conversion characteristics data (initial or default conversion characteristics) which are used when the user does not designate any conversion characteristics. The conversion characteristics calculator 44 changes the value of the initial characteristics data according to the inputted conversion characteristics designation data, and outputs the result of the change as the conversion characteristics data. When the conversion characteristics designation data indicate that the user does not designate the conversion characteristics, then the values of the initial characteristics data are used as the conversion characteristics data.

For instance, if it is designated that the hue of red is set to be shifted toward yellow by one step, the coefficient for the first comparison-result data h1r effective for red is newly calculated. The coefficients for h1r includes a coefficient for calculating R1, a coefficient for calculating G1 and a coefficient for calculating B1. If the hue of red is set to be shifted toward yellow by one step, the coefficients for h1r can be calculated in the following manner. That is, a value corresponding to the absolute value of the red designation data, of the conversion characteristics designation data shown in FIG. 3, is added to the coefficient for calculating G1, of the coefficients for h1r, and is subtracted from the coefficient for calculating B1, of the coefficients for h1r.

Conversion characteristics data for correcting the color reproduction characteristics inherent to the image display unit 34 may be stored as the initial characteristics data. The user may designate the conversion characteristics depending on the user's preference and/or visual environment in which the conversion characteristics setting means is used, starting from the initial values. The initial characteristics storage may be formed of a random access memory, or so-called registers, or any other device that can store desired values. The initial characteristics storage may be of such a configuration that allows the initial characteristics data to be written from the outside.

As has been described, an image display device can be obtained by which it is possible to adjust the hue of the color which it is desired to adjust, without affecting other colors, starting from the initial characteristics stored in advance, by allowing a user to designate the conversion characteristics of the color which is to be adjusted by means of the conversion characteristics designation means.

Moreover, the color converter can be configured of hardware. Accordingly, an image display device can be obtained which can operate on a real-time basis responsive to moving pictures, without placing an excessive load on a CPU.

Furthermore, the image data obtained after the color conversion can be sent to the image display unit via the image data output circuit, so that the image after the adjustment can be displayed on a real-time basis, with a size equal to the original image (image before the adjustment).

Embodiment 3

Figure 16:
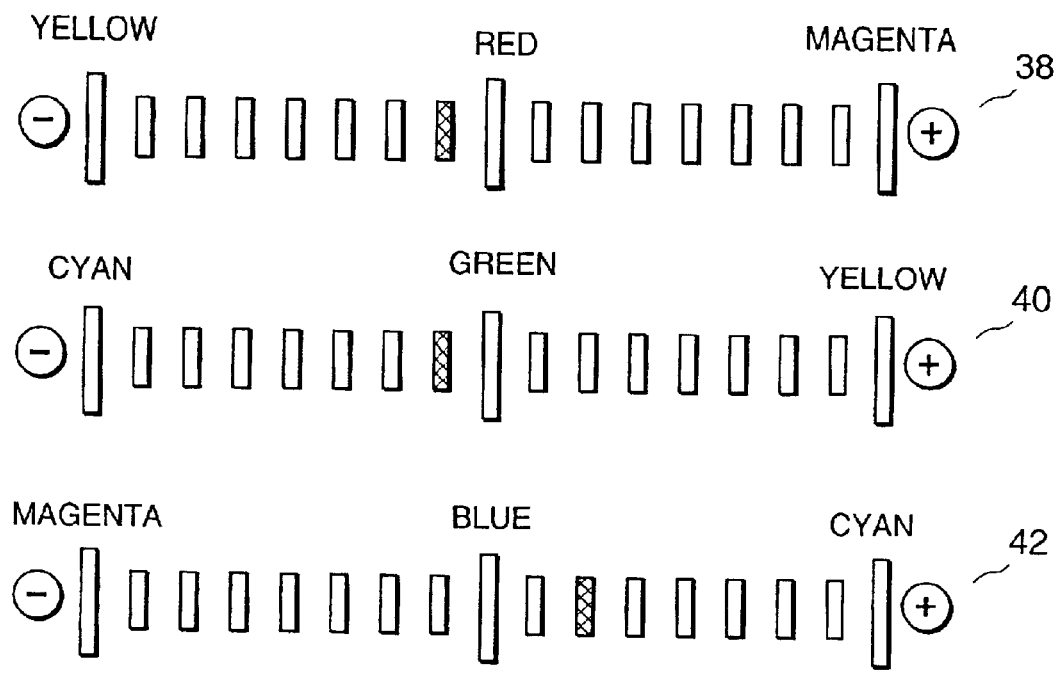
FIG. 16 shows an example of menu displayed on the screen of the image display unit in the image display device of Embodiment 3.

FIG. 16 shows an example of menu displayed on the screen of the image display unit 34 in Embodiment 3. In FIG. 16, reference numeral 38 denotes a red hue adjustment bar, 40 denotes a green hue adjustment bar, and 42 denotes a blue hue adjustment bar. They are identical to those of Embodiment 1 shown in FIG. 2. In Embodiment 1, the user designates the conversion characteristics using the hue adjustment bars for six colors of red, yellow, green, cyan, blue and magenta. In this embodiment, the user designates the conversion characteristics using hue adjustment bars for three colors of red, green and blue. Thus, the designation of conversion characteristics is simpler. The rest of the configuration is identical to that of Embodiment 1.

The user selects one of the red hue adjustment bar 38, green hue adjustment bar 40, and blue hue adjustment bar 42 that corresponds to the color for which the hue is to be adjusted, i.e., the conversion characteristics is to be changed. The selected hue adjustment bar lets the user know that it has been selected, by varying its hue or brightness. When the selection of the desired hue adjustment bar is completed, the user then designates the hue of the selected color. The designation of the hue is performed by selecting one of the two adjacent colors the hue of the selected color is to be shifted, and how far each hue is to be shifted.

By repeating the above-outlined operation, the user can designate the desired color conversion characteristics. In the example of FIG. 16, the designated conversion characteristics is such that the hue of red is shifted toward yellow by one step, the hue of green is shifted toward cyan by one step, and the hue of blue is shifted toward cyan by two steps.

Figure 17:
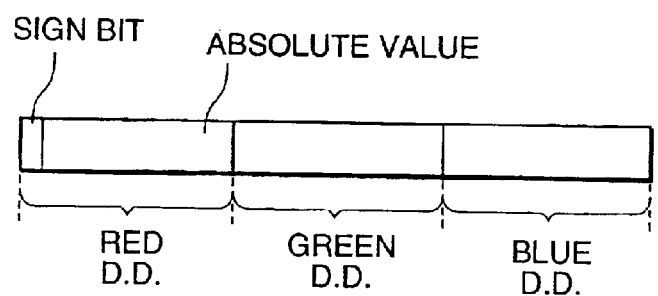
FIG. 17 shows an example of configuration of the conversion characteristics designation data.

The conversion characteristics designation means 37 generates the conversion characteristics designation data in accordance with the values of the red hue adjustment bar 38, green hue adjustment bar 40, and blue hue adjustment bar 42. FIG. 17 shows an example of configuration of the conversion characteristics designation data. In the example shown in FIG. 17, the conversion characteristics designation data comprises red designation data (RED D. D.), green designation data (GREEN D. D.), and blue designation data (BLUE D. D.) which are 1arranged in the stated order. The designation data for each color comprises a sign bit and an absolute value. The sign bit indicates which of the adjacent colors the hue of each color (color in question) is to be shifted. The absolute value of the designation data indicates the degree by which the hue of each color is to be shifted.

When the designation is as shown in FIG. 17, the red designation data is "−1," the green designation data is "−1," and the blue designation data is "+2."

As in Embodiment 1, the conversion characteristics designation data from the conversion characteristics designation means 37 are inputted to the conversion characteristics calculator 44. The conversion characteristics calculator 44 newly calculates and outputs the conversion characteristics data in accordance with the inputted conversion characteristics designation data.

For instance, if it is designated that the hue of red is to be shifted toward yellow by one step, the coefficients for the first comparison-result data h1r effective for red are newly calculated. The coefficients for h1r includes a coefficient for calculating R1, a coefficient for calculating G1 and a coefficient for calculating B1. If the hue of red is set to be shifted toward yellow by one step, the coefficients for h1r can be calculated in the following manner. That is, a value corresponding to the absolute value of the red designation data, of the conversion characteristics designation data shown in FIG. 17, is added to the coefficient for calculating G1, of the coefficients for h1r, or is subtracted from the coefficient for calculating B1, of the coefficients for h1r.

Similarly, when the conversion characteristics of green are designated, the coefficients for the first comparison-result data h1g effective for green are newly calculated, and when the conversion characteristics of blue are designated, the coefficients for the first comparison-result data h1b effective for blue are newly calculated.

The coefficients for the first comparison-result data h1y, h1m and h1c, and the second comparison-result data h2ry, h2gy, h2gc, h2bc, h2bm, and h2rm can be determined on the basis of the coefficients for the first comparison-result data h1r, h1g and h1b effective for red, green and blue. As an alternative, the coefficients for h1y, h1m and h1c, and the second comparison-result data can be calculated directly from the conversion characteristics data. The conversion characteristics designation means 37 newly calculates the values of these coefficients as required.

As has been described, an image display device can be obtained by which it is possible to adjust the hue of the color which it is desired to adjust, without affecting other colors, by allowing a user to designate the conversion characteristics of the color which is to be adjusted by means of the conversion characteristics designation means.

Moreover, the color converter can be configured of hardware. Accordingly, an image display device can be obtained which can operate on a real-time basis responsive to moving pictures, without placing an excessive load on a CPU.

Furthermore, the image data obtained after the color conversion can be sent to the image display unit via the image data output circuit, so that the image after the adjustment can be displayed on a real-time basis, with a size equal to the original image (image before the adjustment).

Embodiment 4

FIG. 18 shows an example of menu displayed on the screen of an image display unit 34 in Embodiment 4. In FIG. 18, reference numerals 38, 39, 40, 41, 43 and 43 denote members identical to those shown in FIG. 2 and described in connection with Embodiment 1. Reference numeral 47 denotes a color temperature adjustment bar.

Figure 20:
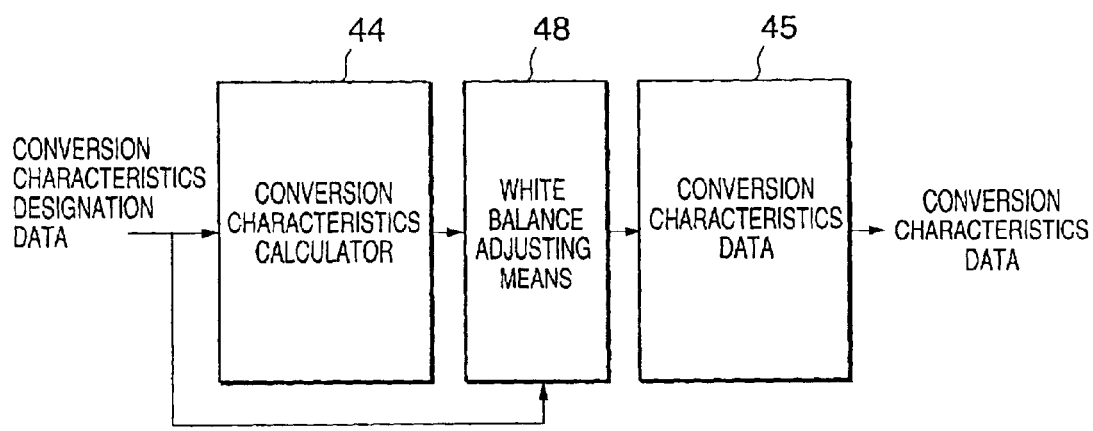
FIG. 20 is a block diagram showing an example of configuration of the conversion characteristics setting means in Embodiment 4 of the invention.

FIG. 20 is a block diagram showing an example of configuration of the conversion characteristics setting means 36 in Embodiment 4 of the invention. In FIG. 20, reference numerals 44 and 45 denote members identical to those shown in FIG. 1 and described in connection with Embodiment 1. Reference numeral 48 denotes a balance adjustment means. In Embodiment 1, the user can designate the conversion characteristics by means of the adjustment bars for the six colors of red, yellow, green, cyan, blue and magenta. In this embodiment, the user can make adjustment on the color temperature, in addition to the six colors.

Figure 19:
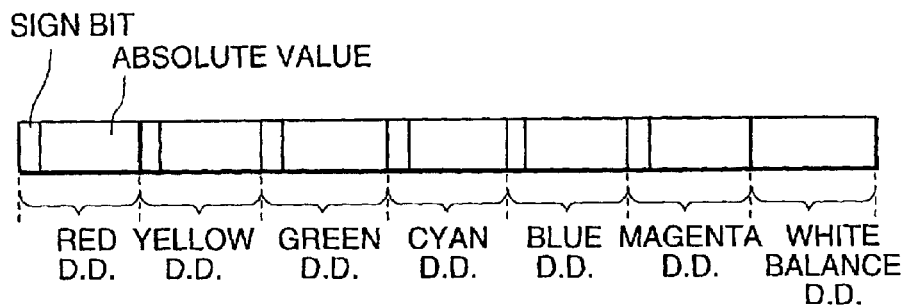
FIG. 19 shows an example of configuration of conversion characteristics designation data outputted from the conversion characteristics designation means 37 in this embodiment.

FIG. 19 shows an example of configuration of conversion characteristics designation data outputted from the conversion characteristics designation means 37 in this embodiment. The conversion characteristics data generated in this embodiment includes the white balance designation data (WHITE BALANCE D. D.), in addition to the conversion characteristics data generated in Embodiment 1. The user can designates the color temperature using the color temperature adjustment bar 47. The conversion characteristics designation means 37 is responsive to the contents or values of the color temperature adjustment bar 47 for calculating the white balance designation data.

The white balance designation data includes information representing the ratio between the intensities of red, green and blue.

The conversion characteristics designation data from the conversion characteristics designation means 37 is supplied to the conversion characteristics setting means 36. More specifically, the conversion characteristics designation data from the conversion characteristics designation means 37 is supplied to the conversion characteristics calculator 44, and to the white balance adjustment means 48. The conversion characteristics calculator 44 newly calculates and outputs the conversion characteristics data on the basis of the values of the red designation data, yellow designation data, green designation data, cyan designation data, blue designation data, and magenta designation data, among the inputted conversion characteristics designation data. The operation is identical to those of Embodiment 1.

The conversion characteristics data outputted from the conversion characteristics calculator 44 is outputted to the white balance adjustment means 48. The white balance adjustment means 48 modifies the conversion characteristics from the conversion characteristics calculator 44, in accordance with the contents or values of the white balance designation data of the inputted conversion characteristics designation data, and supplies the modified conversion characteristics data to the conversion characteristics writing means 45. The conversion characteristics writing means 45 sets the inputted conversion characteristics data in the conversion characteristics storage 35.

As has been described, an image display device can be obtained by which it is possible to adjust the hue of the color which it is desired to adjust, without affecting other colors, by allowing a user to designate the conversion characteristics of the color which is to be adjusted by means of the conversion characteristics designation means.

Moreover, the color converter can be configured of hardware. Accordingly, an image display device can be obtained which can operate on a real-time basis responsive to moving pictures, without placing an excessive load on a CPU.

Furthermore, the image data obtained after the color conversion can be sent to the image display unit via the image data output circuit, so that the image after the adjustment can be displayed on a real-time basis, with a size equal to the original image (image before the adjustment).

In addition, it is possible to adjust the white balance according to the preference of the user.

Embodiment 5

Figure 21:
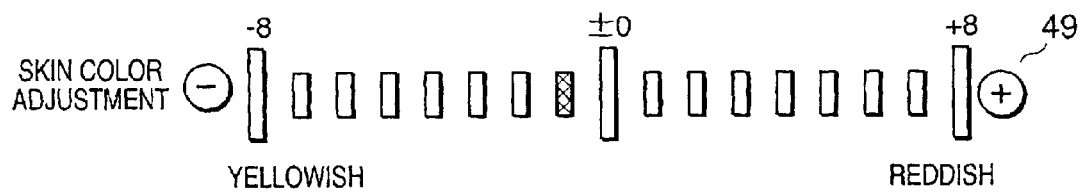
FIG. 21 shows an example of menu displayed on the screen of the image display unit in Embodiment 5 of the invention.
Figure 22:
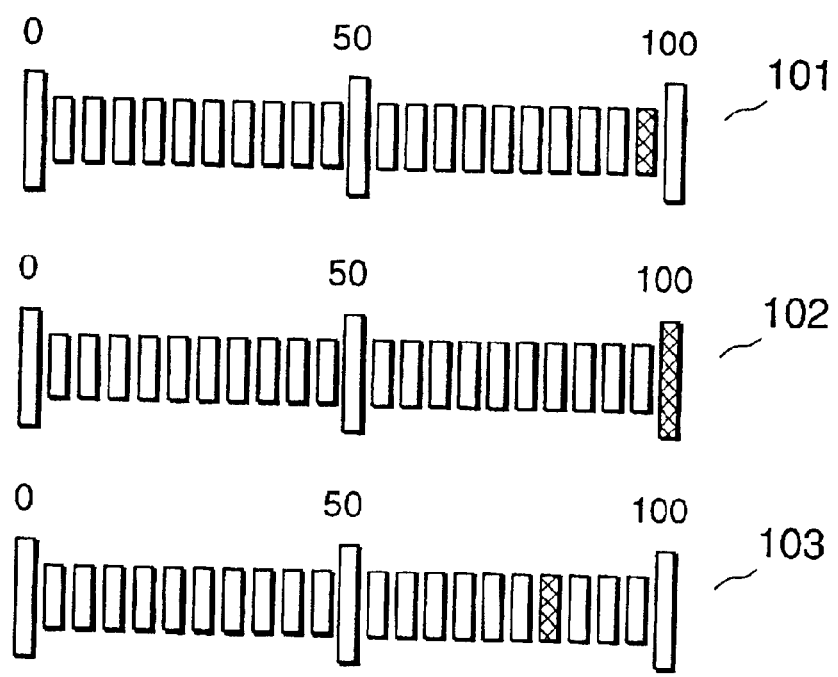
FIG. 22 shows an example of adjustment section for adjusting the color reproducibility in the image display device in the prior art.
Figure 23:
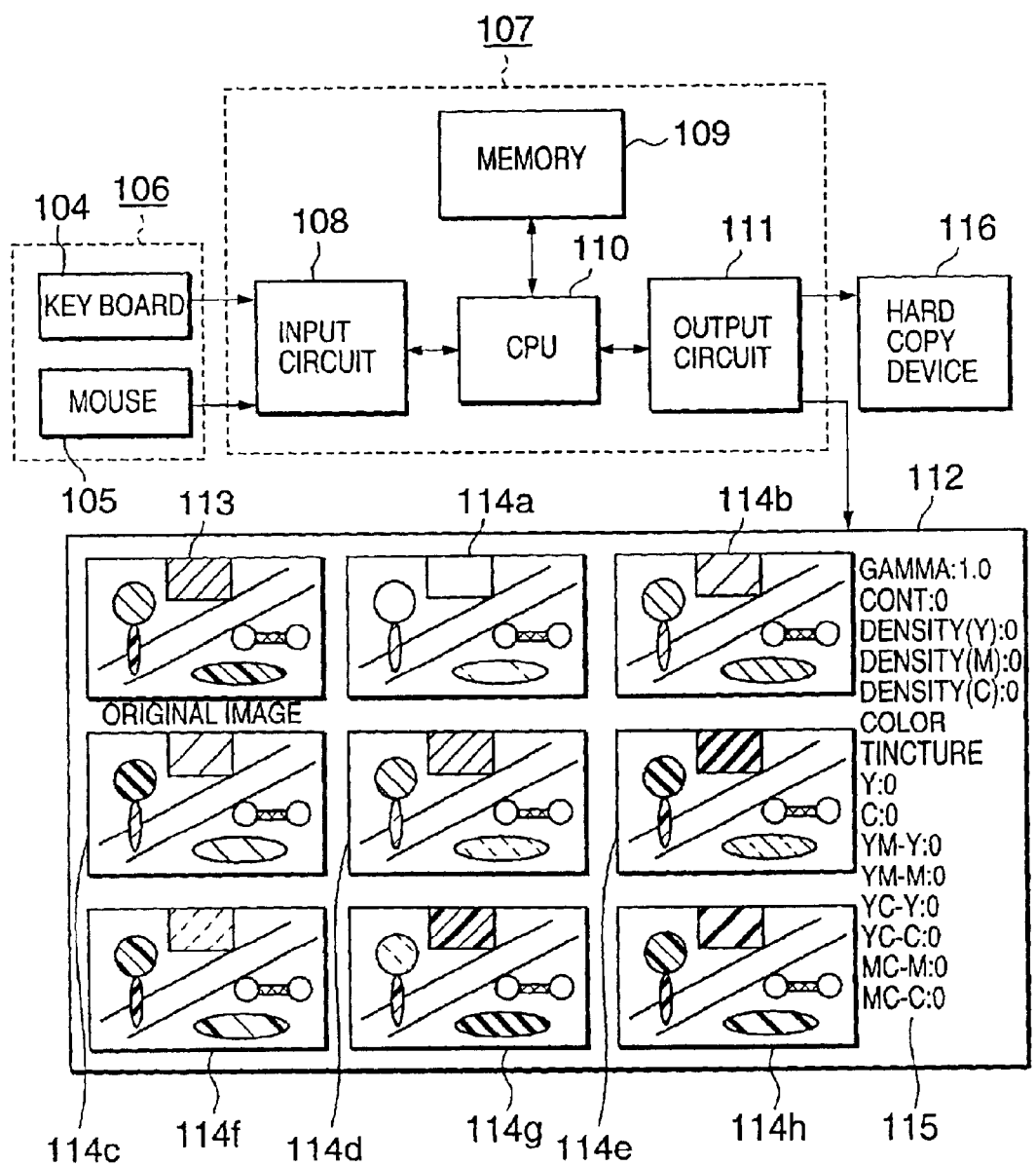
FIG. 23 shows a configuration of the device using the image adjustment method in the image display device in the prior art.

FIG. 21 shows an example of menu displayed on the screen of the image display unit 34 in Embodiment 5 of the invention. In FIG. 21, reference numeral 49 denotes a skin color adjustment bar.

In Embodiment 1, the user can designate the conversion characteristics by means of the adjustment bars for the six colors of red, yellow, green, cyan, blue and magenta. In this embodiment, the user can designate conversion characteristics with regard to the human skin color using the skin color adjustment bar. The rest of the configuration is identical to that of Embodiment 1.

For designating the conversion characteristics of skin color, the user selects the skin color adjustment bar 49. When the adjustment bar is selected, this is made known to the user by the change in the hue or brightness. When the selection of the adjustment bar is completed, the user makes selection of the skin color between "reddish" skin color and "yellowish" skin color, and how far the the hue of the skin color is to be shifted. In the example shown in FIG. 21, the conversion characteristics has been selected by which the hue of the skin color is to be shifted toward the "yellowish" skin color by one step.

In accordance with the value of the skin color adjustment bar 49 designated by the user, the conversion characteristics designation means 37 generates the conversion characteristics designation data. The conversion characteristics designation data comprises the sign bit and the absolute value. The sign bit indicates which of the "reddish" skin color and "yellowish" skin color, the hue of the skin color is to be shifted toward, and the absolute value indicates the degree by which the hue of the skin color is to be shifted. In the example shown in FIG. 21, the conversion characteristics designation is "−1."

As in Embodiment 1, the conversion characteristics designation data from the conversion characteristics designation means 37 is supplied to the conversion characteristics calculator 44. The conversion characteristics calculator 44 newly calculates and outputs the conversion characteristics data in accordance with the contents or values of the conversion characteristics designation data. The skin color is generally in the inter-hue area between red and yellow. For varying the conversion characteristics for the skin color, it is effective to vary the coefficients for the second comparison-result data h2ry.

The coefficients other than the coefficients for the second comparison-result data h2ry need not be changed, but they may also be changed in accordance with the values of the conversion characteristics data.

As has been described, an image display device can be obtained by which it is possible to adjust the hue of the skin color, without affecting other colors, by allowing a user to designate the conversion characteristics of the skin color by means of the conversion characteristics designation means.

Moreover, the color converter can be configured of hardware. Accordingly, an image display device can be obtained which can operate on a real-time basis responsive to moving pictures, without placing an excessive load on a CPU.

Furthermore, the image data obtained after the color conversion can be sent to the image display unit via the image data output circuit, so that the image after the adjustment can be displayed on a real-time basis, with a size equal to the original image (image before the adjustment).

What is claimed is:

1. An image display device for receiving an input image data comprising three or more color data, and displaying the input image data on an image display unit, comprising:

a color converter for converting a first image data comprising three or more color data, into a second image data comprising three or more color data, on the basis of conversion characteristic data;

a conversion characteristic storage for storing the conversion characteristic;

conversion characteristic designation means for designating the conversion characteristic to be used in the color converter, and outputting corresponding conversion characteristic designation data; and conversion characteristic setting means for calculating the conversion characteristic data on the basis of the conversion characteristic designation data, and setting the conversion characteristic data in the conversion characteristic storage;

wherein said color converter comprises:

a calculation term generator for receiving the first image data, and outputting calculation terms which are effective just for specific hues; and a matrix calculator performing matrix calculation using the calculation terms effective just for the specific hues, wherein said conversion characteristic data includes matrix calculation coefficients used in said matrix calculator, and wherein said conversion characteristic setting means calculates the conversion characteristic data by adding or subtracting the value corresponding to the value of the conversion characteristic designation data to or from the coefficients among the coefficients for the calculation term effective for the selected color, among the calculation terms effective just for the specific hues.

2. The image display device as set forth in claim 1, wherein said conversion characteristic designation means comprises:
   means for selecting the color for which the conversion characteristic is to be designated; and
   means for designating the conversion characteristic for the selected color.

3. An image display device for receiving an input image data comprising three or more color data, and displaying the input image data on an image display unit, comprising:
   a color converter for converting a first image data comprising three or more color data, into a second image data comprising three or more color data, on the basis of conversion characteristic data;
   a conversion characteristic storage for storing the conversion characteristic;
   conversion characteristic designation means for designating the conversion characteristic to be used in the color converter, and outputting corresponding conversion characteristic designation data; and
   conversion characteristic setting means for calculating the conversion characteristic data on the basis of the conversion characteristic designation data, and setting the conversion characteristic data in the conversion characteristic storage;
   wherein said color converter comprises:
      a calculation term generator for receiving the first image data, and outputting calculation terms which are effective just for specific hues; and
      a matrix calculator performing matrix calculation using the calculation terms effective just for the specific hues,
   wherein said conversion characteristic designation means comprises:
      means for selecting the color for which the conversion characteristic is to be designated; and
      means for designating the conversion characteristic for the selected color,
   wherein said means for designating the conversion characteristic for the selected color comprises:
      means for selecting one of the two adjacent colors toward which the hue of the selected color is to be shifted; and
      means for selecting the degree by which the hue of the selected color is to be shifted toward the selected one of the adjacent colors.

4. The image display device as set forth in claim 3, wherein the colors for which the conversion characteristic can be designated include red, green and blue, said device comprising:
   means for selecting one of yellow and magenta as said one of the adjacent colors when the selected color is red, for selecting one cyan and yellow as said one of the adjacent colors when the selected color is green, and for selecting one of magenta and yellow as said one of the adjacent colors when the selected color is blue.

5. The image display device as set forth in claim 3, wherein the colors for which the conversion characteristic can be designated include red, yellow, green, cyan, blue, and magenta, said device comprising means for
   selecting one of yellow and magenta as said one of the adjacent colors when the selected color is red,
   selecting one of red and green as said one of the adjacent colors when the selected color is yellow,
   selecting one cyan and yellow as said one of the adjacent colors when the selected color is green,
   selecting one of green and blue as said one of the adjacent colors when the selected color is cyan
   selecting one of magenta and yellow as said one of the adjacent colors when the selected color is blue, and
   selecting one of blue and red as said one of the adjacent colors when the selected color is magenta.

6. The image display device as set forth in claim 3, wherein the colors for which the conversion characteristic can be designated include skin color, said device comprising
   means for selecting one of red and yellow as said one of the adjacent colors when the selected color is skin color.

7. The image display device as set forth in claim 3, wherein said conversion characteristic designation data include:
   information indicating the color selected by said conversion characteristic designation means;
   information indicating the one of the two adjacent colors to which the hue of the selected color is to be shifted; and
   information indicating the amount by which the hue of the selected color is to be shifted toward the selected one of said adjacent colors.

8. An image display device for receiving an input image data comprising three or more color data, and displaying the input image data on an image display unit, comprising:
   a color converter for converting a first image data comprising three or more color data, into a second image data comprising three or more color data, on the basis of conversion characteristic data;
   a conversion characteristic storage for storing the conversion characteristic;
   conversion characteristic designation means for designating the conversion characteristic to be used in the color converter, and outputting corresponding conversion characteristic designation data; and
   conversion characteristic setting means for calculating the conversion characteristic data on the basis of the conversion characteristic designation data, and setting the conversion characteristic data in the conversion characteristic storage,
   wherein said color converter comprises:
      a calculation term generator for receiving the first image data, and outputting calculation terms which are effective just for specific hues; and
      a matrix calculator performing matrix calculation using the calculation terms effective just for the specific hues,
   wherein said calculation term generator comprises:
      color extracting means for extracting chromatic and achromatic components from the first image data; and
      a polynomial calculator performing comparison operation on the chromatic components,
   wherein said color extracting means comprises:
      a minimum and maximum calculator for calculating a minimum value $\alpha$ and a maximum value $\beta$ of said first image data; and a hue data calculator for calculating hue data r, g, b, y, m and c based on said first image data, and said minimum and maximum values α and β outputted from said minimum and maximum calculator, wherein said polynomial calculator comprises:

means for generating first comparison-result data based on the hue data outputted from said hue data calculator; and means for generating second comparison-result data based on said first comparison-result data, and wherein said matrix calculator is responsive to said hue data, said first comparison-result data!and said second comparison-result data, and performs matrix calculation using at least said hue data, said first comparison-result data, and said second comparison-result data, in accordance with the conversion characteristic from said coefficient storage.

9. The image display device as set forth in claim 8, wherein said first image data include three color data of red, green and blue, said minimum and maximum calculator determines the minimum and maximum of the three color data R, G and B;

said hue data calculator calculates the hue data r, g, b, y, m, c by subtraction in accordance with:

$r = R - \alpha$, $g = G - \alpha$, $b = B - \alpha$ $y = \beta - B$, $m = \beta - G$, and $c = \beta - R$;

said first comparison-result generator generates the first comparison-result data between the hue data r, g, b and y, m, c;

said second comparison-result generator comprises:

multiplying means for multiplying predetermined coefficients with said first comparison-result data; and means for producing the second-comparison result data using the output of the multiplying means.

* * * * *